United States Patent
Bartlett

(10) Patent No.: US 8,340,686 B2
(45) Date of Patent: Dec. 25, 2012

(54) POSITIONING SYSTEMS

(75) Inventor: David Bartlett, St. Ives (GB)

(73) Assignee: Omnisense Limited, Cambridge (GB)

( * ) Notice: Subject to any disclaimer, the term of this patent is extended or adjusted under 35 U.S.C. 154(b) by 0 days.

(21) Appl. No.: 13/386,570

(22) PCT Filed: Jul. 20, 2010

(86) PCT No.: PCT/GB2010/051174
§ 371 (c)(1),
(2), (4) Date: Jan. 23, 2012

(87) PCT Pub. No.: WO2011/012880
PCT Pub. Date: Feb. 3, 2011

(65) Prior Publication Data
US 2012/0122485 A1 May 17, 2012

(30) Foreign Application Priority Data
Jul. 31, 2009 (GB) .................................. 0913367.9

(51) Int. Cl.
*H04W 24/00* (2009.01)

(52) U.S. Cl. ............... 455/456.1; 455/404.2; 455/456.2; 342/357.25; 342/357.26; 342/357.12; 342/357.77; 342/357.74; 342/127; 342/129; 342/387; 342/458

(58) Field of Classification Search ............... 455/456.1, 455/404.2, 456.2; 342/357.25, 357.26, 357.12, 342/127, 129, 357.74, 357.77, 450
See application file for complete search history.

(56) References Cited

U.S. PATENT DOCUMENTS

| 4,357,609 | A | 11/1982 | Spencer |
| 7,327,314 | B2 * | 2/2008 | Gezici et al. .................. 342/458 |
| 7,986,270 | B2 * | 7/2011 | Heidari-Bateni et al. .... 342/387 |
| 8,184,038 | B2 * | 5/2012 | Ekbal et al. .................. 342/109 |
| 2007/0200759 | A1 | 8/2007 | Heidari-Bateni et al. |

FOREIGN PATENT DOCUMENTS
WO    WO 2009/078536 A1    6/2009

OTHER PUBLICATIONS
International Search Report for corresponding PCT/GB2010/051174, Mailed Jan. 12, 2011.
Alan Bensky: "*Chapter 4: Time Transfer*"; in "Wireless Positioning Technologies and Applications"; Jan. 31, 2008, Artech House, USA, XP002608060; ISBN: 1596931302, pp. 95-105.

\* cited by examiner

*Primary Examiner* — Kwasi Karikari

(57) ABSTRACT

We describe a device that is able to compute its range and time offset relative to another similar device, and thereby also a three-dimensional position, speed and time relative to other similar devices provided that at least four are present and within range. It does so by transmitting at least two signals at different frequencies and by receiving similar signals transmitted by the other devices. The signals are constructed so that they are independent of the radio band used and so that they lead to cancellation of common-mode effects in the transmitter and receiver circuits. No fixed infrastructure of transmitters, receivers or local measurement units is required and the devices do not need to be synchronized. The system scales to very large networks of devices in which they work collectively each solving a part of the problem that describes the relative positions of all interconnected devices.

15 Claims, 19 Drawing Sheets

POSITIONING SYSTEMS

RELATED APPLICATIONS

The present invention claims priority from PCT Patent Application No. PCT/GB2010/051174, filed 20 Jul. 2010, which claims priority from GB 0913367.9, filed on 31 Jul. 2009, both of which are incorporated herein by reference in their entirety.

FIELD OF THE INVENTION

This invention relates to technology and systems for time distribution and for determining the position and/or velocity of an object.

BACKGROUND TO THE INVENTION

The distribution of time is essential within modern telecommunications networks based on PDH and SDH technology. These networks distribute a master PRC (primary reference clock) throughout the network which is based on a hierarchy of synchronisation levels often referred to as Stratum 1 (the PRC), Stratum 2 being levels synchronised to a Stratum 1 source, Stratum 3 being synchronised to Stratum 2 clocks and so forth.

Management of synchronisation of the clocks is referred to as clock discipline, or disciplining the clock.

Conventionally telecommunications networks are accurately synchronised in frequency with derived clocks that have controlled phase jitter and wander characteristic such as that specified in ITU G.812. However, these networks may have quite large phase offsets and do not have, nor require, absolute time synchronisation.

Mobile networks like GSM, WCDMA and LTE (FDD) operate in a similar way. The base stations require very accurate frequency control which is usually obtained by disciplining the base station clock to a traceable PRC via the core network. Typical base station clock accuracy has to be better than 50 ppb (parts per billion) with phase jitter and wander managed within the boundaries set by ITU G.812, for example. In these networks there is no need for absolute time (phase) synchronisation.

In mobile cellular networks the terminal is synchronised via the radio channel to the serving base station. The propagation time across this radio link is measured and controlled coarsely to roughly microsecond levels—generally for the purposes of managing the radio connections so that all the devices in the network, terminals and base stations, transmit and receive at the correct times.

Other mobile networks including CDMA (IS-95), CDMA2000 and WiMAX (802.16e) do however require accurate time synchronisation since they need both frequency and phase control in order to manage terminal mobility across the network. Obtaining accurate time synchronisation (both phase and frequency) is a somewhat more complex task than only frequency synchronisation, because this requires the slave clock to be corrected for the propagation delay from master to slave. There are, however, a few techniques for obtaining full time synchronisation, the two most widely used being NTP (network time protocol) and GPS, with others like IEEE 1588 and synchronous Ethernet being developed.

An interesting emerging market is for femtocells. These are very small cellular base stations that are connected to the core network via an IP (internet protocol) connection. This is a very elegant and flexible architecture that will allow operators to easily and rapidly provide high quality broadband mobile services in areas that are hard to cover—such as indoors. However, it has introduced the problem of synchronisation, because a general purpose IP connection does not include a clock distribution mechanism such as that present in SDH and PDH networks. Therefore most femtocell developers have had to resort to NTP, GPS or other techniques.

NTP is the most widely used protocol for time synchronisation of computers connected via the internet. The computer exchanges data packets with a time server using the network time protocol. This allows the machine to characterise the round-trip packet delay and then over a long period of time to determine the relative drift rate and offset of the local clock. This allows accurate frequency control to be achieved, and with suitable local oscillators and algorithms it is even possible to achieve frequency control better than 100 ppb. NTP also achieves a good level of time synchronisation by having measured the round-trip delay between computer and time server. With good quality symmetrical networks accuracies in the order of milliseconds can be achieved. This, therefore makes NTP suitable for use in femtocells on GSM, WCDMA and LTE networks, but its performance is not good enough for femtocells on CDMA, CDMA2000 and WiMAX networks.

However, even though NTP is good enough to use in femtocells for WCDMA and LTE networks, they do require a high quality oscillator which is expensive. With cost pressure on femtocells there is a strong desire to find more economical ways of achieving synchronisation.

Another widely used technique for achieving synchronisation in cellular networks, particularly for CDMA, CDMA2000 and WiMAX networks, is GPS. Although GPS was conceived and designed as a positioning system it can also be used as a high quality time source. This is because the satellites contain very stable clocks that are managed and synchronised via the ground control systems. Therefore when a GPS receiver receives signals from four satellites it is able to compute its position and time offset (x, y, z, t). Since the satellites are managed in a time synchronous manner this allows the GPS receiver to determine an accurate absolute time (in relation to the PRC of the GPS network). Many GPS receivers provide a time transfer function that is usually implemented as a physical signal from the receiver generated once per second. The accuracy of this time signal depends on the quality of the GPS receiver and the quality of the signals being received from the satellites. A top quality professional GPS time transfer receiver can achieve time synchronisation accuracies of 20 ns or better when installed and operated correctly. Even low cost GPS receivers are capable of time synchronisation to 100 ns. This makes GPS suitable as a time synchronisation method for femtocells on all current cellular networks. However, adding a GPS receiver adds cost and also restricts the locations where the femtocell can be deployed because GPS operation indoors cannot be guaranteed.

Another common technique used for synchronising femtocells is sometimes referred to as "macro cell sniffing". The femtocell receives and decodes the downlink signal from one or more neighbouring base stations on the cellular network, as though it were a mobile terminal. Since the base stations are accurately synchronised this allows the femtocell to derive its synchronisation from the base station. This approach is workable for GSM, WCDMA and LTE networks in which the femtocell is in the coverage area of at least one other network cell, but it does not provide absolute time (phase) transfer, and therefore is not good enough for CDMA, CDMA2000 and WiMAX networks unless the precise positions of both femtocell and serving base station are known. However, should 3 or more base stations be receivable by the femtocell it can use measurements from all of them to compute its position (x, y)

and clock offset using time difference of arrival algorithms, provided that the positions and synchronisation status of the base stations are known by, or can be supplied to, the femtocell. In practice this technique is not very useful for CDMA, CDMA2000 or WiMAX networks in which 3 or more base stations are seldom simultaneously receivable, but is a good solution for GSM, WCDMA and LTE networks where the femtocell is installed into an existing network within the coverage area of at least one base station.

A number of other techniques could be used for femtocell synchronisation and time transfer to mobile devices: broadcast infrastructure such as TV and radio transmissions; eLoran, which is presently proposed as a backup to GPS for transportation; other satellite navigation systems such as GLONASS, Galileo or COMPASS.

With the emergence of femtocells and also the migration of telecommunications networks towards the all-IP architecture the issue of time synchronisation is becoming significant. Several new approaches are in development or have been proposed:

- IEEE 1588 is proposed as an enhanced protocol for synchronisation across IP. It includes layer 2 timing capability and methods for propagating physical timing information across switches, routers and other boundary equipment.
- ITU G.8261 is a standard emerging from the ITU for time transfer across synchronous Ethernet networks. The ITU is also working on implementations for general IP and MPLS networks.

One of the corollaries of being able to accurately measure time offsets in wireless systems is that given the near constant propagation speed of radio signals in air it is possible to also compute the position of the receiver or transmitter.

One of the best known such systems today is GPS. GPS works by measuring the time of arrival of signals transmitted by a constellation of 24 to 30 satellites orbiting the earth. At any one time up to 9 or 10 satellites may be in view. The receiver receives, decodes and measures the signals from the satellites and solves for the position (x, y, z) and time (t) offset of the receiver. Since the satellites are equipped with very accurate clocks that are synchronised precisely, the time offset represents the unknown offset of the receiver clock relative to the satellite system clock.

However, systems that use time measurement to compute the position of a receiver have been around for a long time and include well known systems such as DECCA and LORAN (now being modernised as eLORAN). The techniques used in many such systems can be traced back to the principles of U.S. Pat. No. 2,148,267. More recently systems that use measurements of cellular base stations, TV and radio broadcasts, or signals transmitted by other radio infrastructure such as WiFi Access Points have been developed. Some of these systems use Received Signal Strength (RSS) or Angle of Arrival (AOA) to determine the position of the receiver or transmitter, but these techniques are relatively imprecise and therefore high accuracy X,Y,Z positioning systems generally work using a few variants of time or range measurement:

- TOA, Time Of Arrival—the system is operated using synchronised clocks and therefore the measurement can be equated directly to a range, or in the case of the receiver clock being unsynchronised as an apparent range comprising a measured range plus a range error introduced by the clock offset, as for example in GPS.
- TDOA, Time Difference of Arrival—the transmitters are unsynchronised so the receiver uses the time difference between a pair of transmitters to determine a hyperbolic locus of possible positions. By using two or three pairs of the transmitters the intersections of these loci determines the position of the receiver. This technique is sometimes referred to as OTDOA (Observed TDOA) and in the case of GSM networks as E-OTD (Enhanced Observed Time Difference). Proponents of this approach include Cambridge Positioning Systems, for example U.S. Pat. No. 5,045,861 and Ericsson.
- Round-trip time-of-flight—the mobile receiver retransmits signals received back to the transmitter thereby allowing a direct measurement of time-of-flight and thus range or double range. For example the system described in U.S. Pat. No. 6,611,234. Such systems may use a measurement of the reflected signal as used in radar systems, or they may actively retransmit the received signal—in which case knowledge of the "transponding" delay in the receiver is critical for accurate range measurement.

In systems in which the transmitter clocks are unsynchronised a means to determine their relative offsets is required. This is usually done using one or more LMUs (Local Measurement Units). As for example is described in U.S. Pat. No. 7,260,407. By placing the LMU at a known location and measuring the time of arrival of signals from the unsynchronised transmitters it is possible to compute the relative time offsets and thereby reference all the transmitters to the LMU clock, or to an arbitrary virtual clock.

All of the above systems require an infrastructure—transmitters—with the precise positions of the transmitters being known. The positions of any LMUs that are used also need to be known. Some systems make use of a pre-existing infrastructure such as the base stations of a mobile cellular telecommunications network. Others deploy their own infrastructure, for example GPS.

Other systems have used the same concept but exchanged the functions of the transmitters and receivers. In these systems a mobile transmitter transmits a signal which is received and measured by a number of fixed receivers. Using measurements from at least 4 receivers the unknown position (x, y, z) and time (t) of the mobile transmitter can be determined, thereby allowing the transmitter to be tracked. In these systems the positions of the receivers need to be known precisely, and if they are unsynchronised a means of determining their clock offsets, such as the use of at least one LTU (local transmitter unit), is required to enable the receiver clock offsets to be determined. Examples of systems that use this approach are Uplink TDOA (True Position), Ultrawideband Systems and many of the commercially available systems falling into the category of Real Time Location Systems (RTLS).

This application puts forward a new technique that enables time synchronisation to be achieved between two or more devices that may be connected using either a wireless or wired connection, and which also enables the ranges or distances separating the devices to be determined, and hence their relative positions to be determined. It is therefore a combined ranging and time synchronisation technique for use on both wired and wireless networks.

When there are clusters of more than two devices, such as in a wireless network, it allows all devices to be accurately time synchronised and for the relative positions of them to be accurately determined. With three devices relative position and velocity on a 2D plane may be determined. With four or more devices 3D position and velocity can be determined. The system brings five significant improvements over current systems:

1. No infrastructure of transmitters or receivers is required—the devices determine their positions, velocities and time relative to other similar devices without the need for fixed infrastructure.
2. The way the signals are constructed makes the system agnostic of frequency band. Therefore it is not restricted to a particular band such as 2.4 GHz or UWB, and the techniques can be used in radiolocation systems as well as for systems using optical or acoustic communications.
3. The signals transmitted between devices to measure the range are transmitted asynchronously and the need for knowing time delays between received and transmitted signals is much less stringent than competing systems— some 6 orders of magnitude less so.
4. The system is unsynchronised and nor is it necessary to maintain a timing model that pseudo-synchronises device clocks, generally obtained by using LMUs (local measurement units) for fixed transmitters in traditional systems.
5. The system is symmetrical, or commutative, in that devices may compute their own position velocity and time (relative to the others), or they may compute the position, velocity and time of other devices in the network. It is, therefore, a combined location and tracking system. It is a system that could be used for the very accurate relative positioning of mobile wireless devices as an extension to existing standards such as 802.11, 802.15, WiMAX, DVB-T, DAB, cellular or others, or it could be implemented in an entirely proprietary way as a means of obtaining very accurate real-time position and time information. As such it has many uses in the fields of WSN (wireless sensor networks) and RTLS (real time locating systems), typically used in applications like: healthcare, asset tracking, emergency services, sport and others.

SUMMARY OF THE INVENTION

According to a first aspect of the present invention there is provided a method of determining a relative range (position/distance), relative velocity of motion, clock frequency offset, clock phase offset or time reference of a first device with respect to a second device, the method comprising: sending a first reference signal from said first device to said second device at a first time, wherein said first reference signal has a frequency and phase determined by a first reference clock of said first device; receiving at said first device a second reference signal sent from said second device at a second time, wherein said second reference signal has a frequency and phase determined by a second reference clock of said second device; determining a phase of said second reference signal with respect to said first reference clock and determining a frequency of said second reference signal; receiving from said second device measurement data, said measurement data comprising data from a determination of a phase of said first reference signal with respect to said second reference clock and from a determination of a frequency of said second reference signal at said second device; determining at least one of said relative range, relative velocity of motion, clock frequency offset, clock phase offset or time reference of said first device with respect to said second device by determining a substantially self-consistent solution to at least one equation of a set of equations of the form:

$$d(t_i) = f_d(\Phi_m(t_i), \theta(t_i))$$

$$v(t_i) = f_v(\Delta f_m(t_i), \zeta)$$

where $f_d$ and $f_v$ are respective range and velocity determining functions;
$t_i$ labels said reference times;
$d(t_i)$ labels said relative range at said reference times;
$v(t_i)$ labels said relative velocity at said reference times;
$\Phi_m(t_i)$ labels said determined phase at said reference times;
$\theta(t_i)$ labels at phase offset between said first and second reference clocks at said reference times;
$\Delta f_m(t_i)$ labels a frequency difference between a said determined frequency and a frequency of a said reference clock at the device at which said frequency is determined, at said reference times; and
$\zeta$ labels a frequency offset between said first and second reference clocks at said reference times; and
wherein said first and second reference clocks are unsynchronised with one another, and wherein said determining of said substantially constant solution comprises compensating for a said phase and frequency offset between said first and second reference clocks such that a frequency offset and changing phase one of said unsynchronised reference clocks is characterised with respect to the other of said reference clocks by said parameters $\theta(t_i)$ and $\zeta$.

In embodiments of the method the frequency offset $\zeta$ and velocity v can be determined from a self-consistent solution to the set of equations and, in particular, without solving for relative range, d, and phase offset, $\theta(t)$ of the two oscillators. However in general the equations will also be solved for range d, which in turn determines a reference time offset and hence effectively sets a time reference between the two devices. The technique is particularly advantageous because the time interval between the two (or more) times is used to compensate for phase roll or drift between the local and remote reference clocks but is not used per se for time flight measurement, and can therefore be relatively inaccurate. The skilled person will appreciate that embodiments of the above described method may be implemented on either the first or the second device, or on both devices. If implemented on one device, if the second device needs the data this may be reported to it from the first device.

In embodiments of the method the processing, more particularly the determination of a substantially self-consistent solution to the equations, may be performed on one device, all the devices, or on none of the devices, instead being implemented on a separate processor (which may be advantageous if, say, power consumption/processing power is limited).

The technique can be extended to determine a 2-dimensional or 3-dimensional position for a device if pairwise communication between pairs of devices to establish relative range, and optionally velocity, is available between two or more pairs of devices.

In embodiments one device of a cluster of devices can determine the range of all the devices in a cluster or subcluster of the devices, in effect using range data to different neighbours. The equations can be solved algebraically but since in practice the data has noise imposed it can be more robust to generate a solution by minimising a cost function determined by the aforementioned equations. This also has the advantage that a parameter may be over-determined for an improved accuracy solution using this technique. All four parameters—velocity, range, frequency offset, and phase offset—may be minimised simultaneously in such an approach, but in embodiments it may preferable to weight one or more parameters which are particularly important for an application, for example range, to reduce the error in the most important parameter(s).

The processing power for a large cluster of devices where each, or at least one, device uses range data from all the rest, can be relatively significant (growing more than linearly with the cluster size). In embodiments, therefore, an iterative approach is used for determining positions of devices in a cluster of devices: initially an arbitrary device is picked as a fiducial point and the positions (ranges) of a set of other devices relative to this reference device are solved, and then this data is shared with the rest of the devices. These in turn compute their new positions (ranges), more particularly determining their positions (ranges) with respect to their neighbours, and so forth. This enables the positions of some devices to be left undetermined at stages in the procedure, and reduces the overall calculation overhead. In embodiments devices may determine their own position and then share their position with other devices so that all the computed ranges are relative to the device picked as the fiducial point. Alternatively the arbitrary device picked as the fiducial point may determine the positions of the set of other devices relative to this reference device, i.e. keyed to the first fiducial position. In some implementations, the positions of the second devices may be determined at the first device and the positions of the third device may be identified at the second device(s), so that the position data propagates through the cluster. In preferred implementations of this approach rather than equations being solved for range and velocity the position is expressed in terms of the co-ordinate system used, for example a Cartesian co-ordinate system, so that when solving the equations these are solved for a position and velocity in the selected co-ordinate system, for example x, y, z, $v_x$, $v_y$, $v_z$. As the calculation progresses and neighbours in turn determine their positions it is preferable that information about the phase and frequency offset is also shared, in embodiments explicitly determining relative clock offsets as the procedure progresses. In this way, in effect, a reference time or time standard can be determined for the cluster. In implementations of the procedure a first device is used to define an arbitrary fiducial point, in particular an origin, for the co-ordinate system, a second device position is used to define an X-axis, a third device, an X-Y plane, and then these devices determine a co-ordinate system within which the rest of the unknown device positions can be specified. (In practical applications this co-ordinate system may often be in motion, but it will be appreciated that this has no effect on the relative range/velocity determinations within a cluster).

As previously mentioned, it is useful for robust measurements to employ data from between 5 and 15 neighbouring devices to over-determine a range (and velocity). In embodiments it is also advantageous to use velocity as an additional constraint to the solutions of the equations since velocity is given by change in distance over change in time. This enables a better estimate of the relative positions, in effect loosely coupling the different solutions; this is particularly advantageous if there are multiple measurements of range and/or velocity. This approach is effective in part because a solution of the equations effectively provides the velocity as an extra parameter "for free".

In a related aspect the invention provides a method of determining a relative range, relative velocity of motion, clock frequency offset, clock phase offset or time reference of a first device with respect to a second device, the method comprising: receiving a first reference signal at said first device, from said second device, at a first time, wherein said first reference signal has a frequency and phase defined by a second reference clock of said second device; determining a phase of said first reference signal with respect to a first reference clock of said first device, and determining a frequency of said first reference signal; repeating said receiving and determining for second and third said reference signals received at second and third respective times; determining at least one of said relative range, relative velocity of motion, clock frequency offset, clock phase offset or time reference of said first device with respect to said second device by determining a substantially self-consistent solution to a set of equations of the form:

$$d(t_i) = f_d(\Phi_m(t_i), \theta(t_i))$$

$$v(t_i) = f_v(\Delta f_m(t_i), \zeta)$$

where
$f_d$ and $f_v$ are respective range and velocity determining functions;
$t_i$ labels said reference times;
$d(t_i)$ labels said relative range at said reference times;
$v(t_i)$ labels said relative velocity at said reference times;
$\Phi_m(t_i)$ labels said determined phase at said reference times;
$\theta(t_i)$ labels at phase offset between said first and second reference clocks at said reference times;
$\Delta f_m(t_i)$ labels a frequency difference between said determined frequency of said first reference signal and a frequency of said first reference clock at said reference times;
$\zeta$ labels a frequency offset between said first and second reference clocks at said reference times; and
wherein said first and second reference clocks are unsynchronised with one another, and wherein said determining of said substantially constant solution comprises compensating for a said phase and frequency offset between said first and second reference clocks such that a frequency offset and changing phase of one said unsynchronised reference clocks is characterised with respect to the other of said reference clocks by said parameters $\theta(t_i)$ and $\zeta$.

In embodiments the relative range of the two devices is determined, which then enables a reference time to be defined. For example this may use the local oscillator, determined frequency offset and phase offset (as a function of time) to the remote oscillator (in effect linking the local and remote oscillators), in combination with the range between the two oscillators, which determines a delay (based on the time of flight of the signals in the relevant medium).

Embodiments of the above described method employ measurements at just the receiving device, and such an approach can therefore be employed for distributing a clock, for example in a wired network. With such an arrangement the remote clock data is less directly accessible and the system of equations includes equations which are not properly independent, absent real life noise. Therefore three rather than two measurements are, in embodiments, the minimum number of measurements employed to determine relative range/velocity/clock/time offset.

The skilled person will recognise that in embodiments of the method it is not necessary to explicitly calculate all the variables/parameters defined by the equation—for example only relative range may be determined explicitly if only this is needed. The same is true of the frequency difference—this need not be determined explicitly. In embodiments the frequency difference is determined by multiplying two signals to provide sum and difference frequencies, and then extracting the difference using a fast Fourier transform.

In embodiments of the procedure the set of equations to which a substantially self-consistent solution is determined is:

$$d(t_i) = \alpha(\Phi_m(t_i) - \theta(t_i))$$

$v(t_i) = \beta(\Delta f_m(t_i) - \zeta)$ where α and β are constants.

In embodiments additional measurements may be made. The additional measurement build up more equations over a greater time span thereby introducing redundancy and robustness into the determination of the substantially self-consistent solution. In embodiments of the method the phase and frequency offset between the two reference clocks is effectively calculated back to a reference time, for example determining the phase offset at one of the signal times (although it will be recognised that the phase and frequency offset need not be explicitly determined). In embodiments the reference point in time at which the phase and frequency offset are calculated is a most recent time of those associated with the available reference signals.

In embodiments of the above described methods a reference signal may comprise a pair of tones, preferably relatively closely spaced in frequency. These are helpful to resolve phase ambiguities since the effective wavelength is that of the frequency difference between the two tones. In effect, therefore, the method operates with the difference frequency as the reference signal. Optionally two, three or more pairs of tones may be employed to better reduce the phase (cycle) ambiguity. However it is not essential to use two tones—whether this is desirable depends upon how far the devices are likely to get apart. In embodiments the 2 tones may be generated from a common clock signal generator, for example by multiplying by n & n+m, with, say, m=1; more generally the reference signal has at least one phase and at least one frequency set by or in fixed relationship with a reference clock from which it is derived. The skilled person will recognise that in implementations the reference signal will often be modulated onto a carrier.

It will be appreciated that although embodiments of the above described system are particularly useful for radio frequency communications, the techniques are not limited to RF communications and may be employed, for example, with sonar.

The invention, still further provides processor control code to implement the determination of a substantially self-consistent solution to equations as described above, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

The invention also provides a device, in particular comprising a processor coupled to working memory and non-volatile program memory storing processor control code as described above, together with a reference clock and at least one of a transmitter and receiver. Thus in one aspect the invention provides a device comprising means configured to implement a method as described above.

In a further aspect the invention provides a cluster of devices, each with a reference clock, at least some of said devices having a reference signal generator to generate a reference signal having a phase and frequency determined by said reference signal generator and having a transmitter to transmit said reference signal, at least some of said devices having a receiver to receive said transmitted reference signal, at least one of said devices including a processor to process frequency data and phase data derived from comparison of a said received reference signal with a local reference clock, wherein said at least one device is configured to receive said reference signal data from a plurality of other said devices and to determine its position relative to said other devices by determining a substantially self-consistent solution of a set of equations defining pairwise relationships between positions and velocities of pairs of said devices and said frequency data and phase data.

The skilled person will appreciate that in such a cluster not every device needs to transmit or receive—for example some of the devices could be transmitting only and some receive only. In principle only a single device needs to receive to determine the positions of all the devices in the cluster (depending upon whether 1, 2- or 3-dimensional position data is desired).

In a further aspect the invention provides a method of determining a range or velocity of a first device relative to a second device, comprising: sending a first at least two tones from the first device to the second device and a second at least two tones from the second device to the first device, each of the first at least two tones having a frequency and a phase offset from a first reference signal and each of the second at least two tones having a frequency and a phase offset from a second reference signal, the frequency and the phase offset of each of the second at least two tones having the same relative frequency and phase relationship to each of the respective first at least two tones; receiving each of the first and second at least two tones at the other of the first or second device, determining a frequency and a phase offset for each of the first at least two tones from the first device using the second reference signal, and determining a frequency and a phase offset from each of the second at least two tones from the second device using the first reference signal; sending the frequency and the phase offset of each of the first at least two tones determined using the second reference signal from the second device to the first device; receiving at the first device, the frequency and the phase offset of each of the first at least two tones determined using the second reference signal at the second device; and at the first device, using the frequency and the phase offset of each of the first at least two tones determined using the second reference signal and the frequency and the phase offset of each of the second at least two tones determined using the first reference signal to determine the range or velocity of the first device relative to the second device.

Preferably the method further comprises sending the frequency and the phase offset of each of the second at least two tones determined using the first reference signal from the first device to the second device; receiving at the second device, the frequency and the phase offset of each of the second at least two tones determined using the first reference signal at the first device; and at the second device, using the frequency and the phase offset of each of the first at least two tones determined using the second reference signal and the frequency and the phase offset of each of the second at least two tones determined using the first reference signal to determine the range or velocity of the first device relative to the second device.

In embodiments said frequency and said phase offset may be replaced by an average frequency offset of said two tones to a respective said reference signal and a phase difference between said two tones.

The average frequency offset may be defined by: average ($\Delta f_x$, $\Delta f_y$), where $\Delta f_x$ is the frequency difference between the determined frequency of the first of the two tones and a frequency of the first reference clock, and $\Delta f_y$ is the frequency difference between the determined frequency of the second of the two tones and the frequency of the first reference clock, and the phase difference $\Delta\Phi$ may be defined by: $\Delta\Phi=\Phi_x-\Phi_y$, where $\Phi_x$ is the phase of a first of the two tones, and $\Phi_y$ is the phase of the second of the two tones.

For frequency, whether one averages the difference or differences the average is mathematically the same. However, in practice we always compute the average of the frequency differences referred to the reference clock. So actually what we are doing is computing the difference between the reference clocks at either end. Since the same reference clock is used to generate the two tones: for example by multiplying by m and m+1, when we measure the frequency difference in practice we represent it in terms of the difference between the reference frequencies and this is what allows us to average the frequency errors.

Specifically we measure tone 1 and convert the frequency difference to a frequency difference of the reference oscillators, and we measure tone 2 converting its frequency difference into a difference between the reference oscillators (using the respective scaling factors for the tones). Therefore we can now simply average the two frequency differences to give us a better estimate of the frequency difference between the two reference oscillators.

Multiple measurements may be made at different times. Three or more tones may be employed and the frequency and the phase offsets may then determined between multiple pairs of tones.

Tone differences may also be employed in a one-way system analogous to that described above.

Thus in a further aspect the invention provides a method of determining a reference clock comprising: receiving at a first device at least two tones having a frequency and a phase determined by a reference clock of a second, remote device; determining a frequency and a phase offset of the at least two tones using a first reference clock of the first device; and repeating said receiving determining at least three times to determine one or both of said frequency and phase of said tones with respect to said reference clock of said second device.

In embodiments the frequency is an average frequency offset of said two tones and said phase offset comprises a phase difference between said two tones. The invention still further provides a system comprising means configured to implement the methods described above for determining a range or velocity of a first device relative to a second device or determining a reference clock.

DETAILED DESCRIPTION

Introduction

Figure 1:
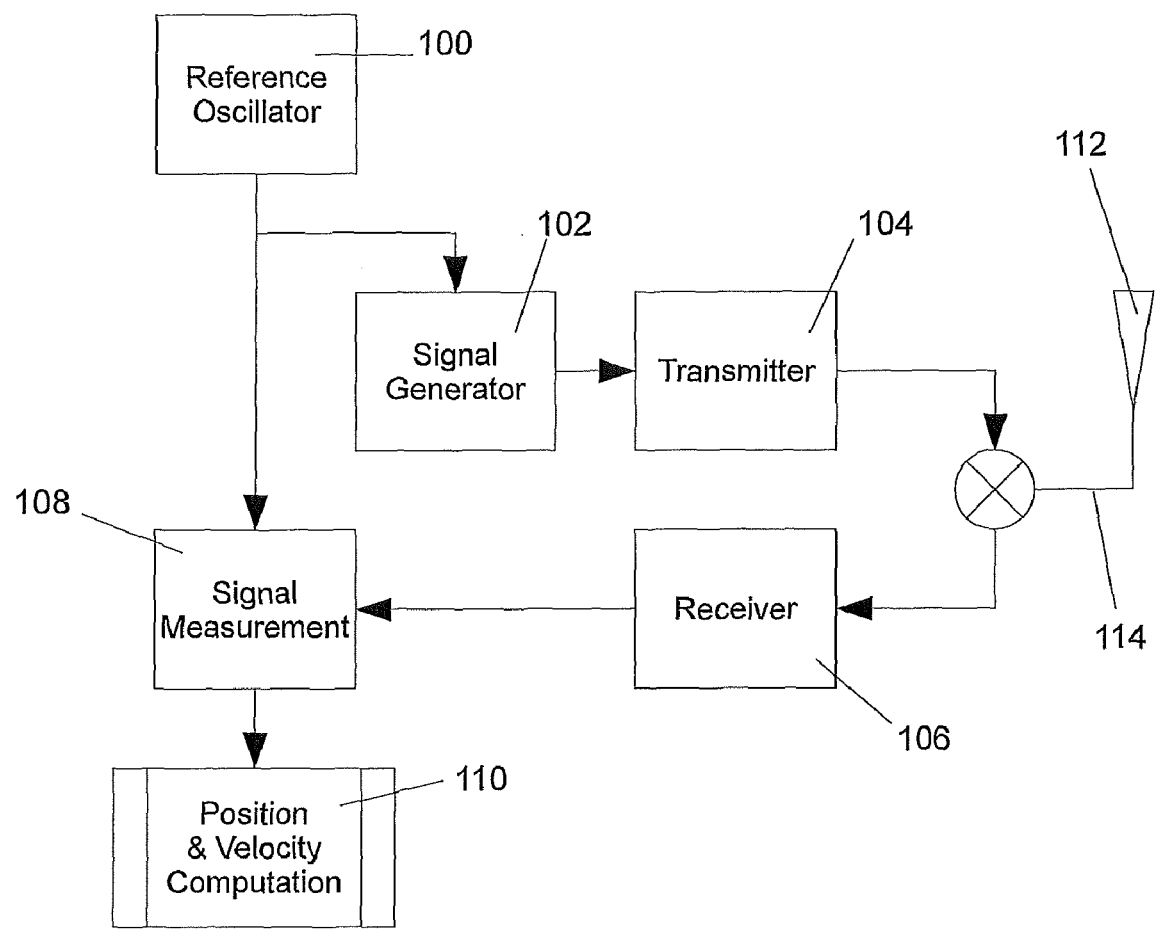
FIG. 1 shows a block diagram of a generic device showing the main functional blocks for position and time localisation.

Broadly speaking, n accordance with a first embodiment two devices determine their relative range, range velocity and time offset: a first device transmits two related signals, which may be concurrent or consecutive, derived from a common clock and having a defined phase and frequency relationship, to a second device; the second device measures the phase and frequency of the two signals and sends the measured parameters to the first device; at a time of its own choosing the second device transmits to the first device two new signals having the same relationship as those received from the first device; the first device measures the phase and frequency relationships of the signals received from the second device and sends the measurements to the second device; by combining the measurements made at first and second devices either or both of them are able to compute the range, range velocity and time offset between the first and second devices.

When three devices are able to transmit to one another, the relative positions, speeds and time offset may be determined on a two dimensional plane, by virtue of having three interconnected ranges.

When four or more devices are able to transmit to one another, the relative positions, speeds and time offset may be determined in three dimensions by virtue of having six interconnected ranges.

Larger clusters of devices are able to be positioned relative to one another in three dimensional space provided every device can receive and be received by at least three others.

Measurements over and above the minimum required can be used to enhance the confidence in, and accuracy of, the system through the presence of redundant measurements.

Each device may transmit more than two related signals in order to improve performance and/or reliability.

By transmitting multiple signals at different times, a better measurement of range can be made, and with 3 or more signals range can be computed using only measurements made at one end of the link. This allows general positioning systems to be constructed from clusters of devices that may support two-way range and time measurements as well as devices that are transmit-only or receive-only.

The system is agnostic of transmission frequency and may use different frequencies or bands as long as the relationship between the related signals is preserved.

Each device measures the signals received using its own reference clock, and it generates the signals it transmits using its own reference clock. Its reference clock may run asynchronously and there is no need for it to be locked to a master timing reference or disciplined in any particular way.

Each device transmits its signals asynchronously at a time of its own choosing—there is no need to manage, measure or characterise the delay between receiving a measurement signal set and transmitting a measurement signal set.

The same techniques can be used by devices connected by a physical cable in order to accurately time synchronise them, and to determine the cable length.

The technique can also be applied to other physical media, such as acoustic or ultrasonic signals, transmitted through air or under water for sonar applications.

Range Measurement and Time Transfer

Each device transmits signals to neighbouring devices, and measures signals it receives from neighbouring devices. It comprises the following functional blocks, shown in FIG. 1:

A reference oscillator 100,
A signal generator function 102,
A transmitter 104,
Antenna 112,
Antenna cable 114,
A receiver 106,
A signal measurement function 108,
A position computation function 110.

The reference oscillator 100 provides the timing source controlling both generation 102 and measurement 108 of signals in the device. All timing functions are derived from this clock and therefore it acts as a single common timebase. The stability of the clock is chosen according to the performance requirements of the system, but it could, for example, be generated using a low cost ±4.6 ppm TCXO (temperature compensated crystal oscillator). Typically a relatively low frequency, such as 50 kHz, would be used as the master reference.

Figure 2A:
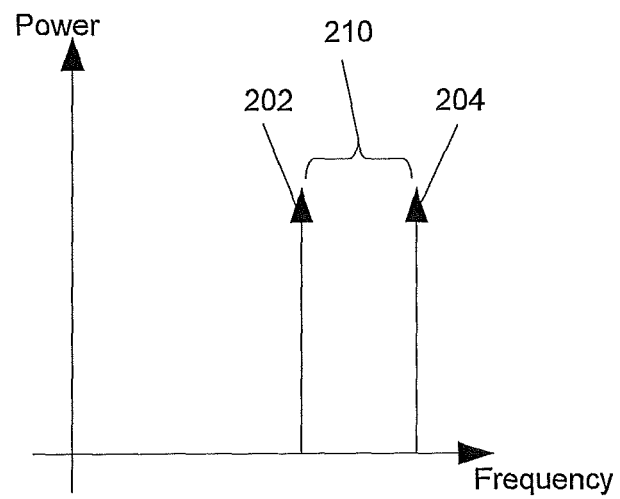
FIG. 2 illustrates how the device can use a pair of signals which are independent of the frequency band used.
Figure 2B:
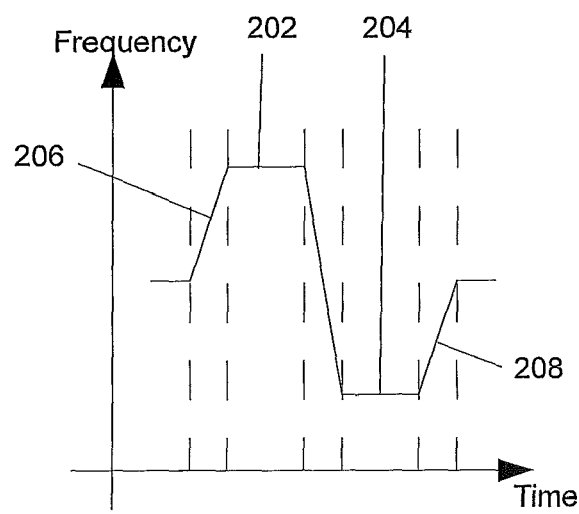
Figure 2C:
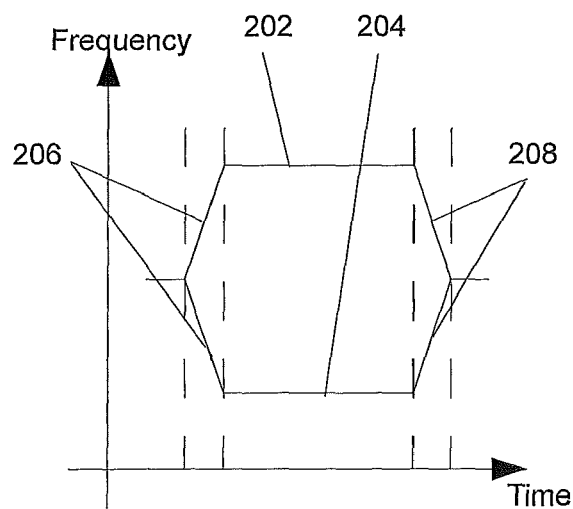

The signal generator 102 is used to construct the signal to be transmitted, typically at regular intervals, often in the range of 100 ms to 1 s. The signal comprises two or more tones, the spacing between them being selected according to the required system performance. FIG. 2A shows two tones 202 and 204 at different frequencies. For example a frequency spacing 210 of 3 MHz represents a wavelength of 100 m which experience has shown can be reliably measured to about 1% of the wavelength which translates into a position accuracy of about 1 m and 3 ns in time. The signal is usually quite short in duration, typically being around 1 ms to 10 ms. The signal comprising the tones may be transmitted concurrently FIG. 2B 202 204 or sequentially FIG. 2C 202 204, the choice being dependent on the capabilities of the hardware design.

The transmitter 104 converts the baseband signal to the band of operation, such as for example 2.4 GHz, amplifies it and outputs it to a suitable antenna 112. The architecture and design of the transmitter may use any desired architecture, such as: classical up conversion, heterodyne, direct quadrature modulation, fractional N synthesis etc., the choice being according to the required system parameters and performance. The times 206 and 208 indicated in FIG. 2B and FIG. 2C allow for the local transmitter oscillator to start up and stabilise before transmitting the signal and to shut down afterwards.

The receiver 106 receives signals transmitted by neighbouring devices, amplifies them and converts them back to baseband. Any desired receiver architecture may be used, the choice and detailed implementation being dependent on the required performance of the system.

The signal measurement function 108 measures phase and frequency of the signals. Using the phase measurements of the individual signal components a set of differential phase measurements is derived—one for each pair of tones; 202 and 204 in FIG. 2 comprise a pair of tones. Since the transmitter of one device and receiver of another are operated from different unsynchronised oscillators the phase measurement includes an unknown phase offset between the timing references, as well as an unknown frequency offset.

The position computation function 110 uses the phase and frequency measurements to determine the relative position and velocity of the transmitter and receiver. In order to do this it normally uses measurements made at both ends of the link. Consider two devices A and B in the signal flow diagram FIG. 3. A transmits a signal 302 to B which measures the received signal parameters. It sends these measurements 308 to A and at a separate time after a delay 306 transmits a signal 304 to A, which makes its own measurements and transmits them 310 back to B. Using the phase measurements made at both A and B, either or both of A and B are able to solve for the range between A and B and the unknown reference oscillator phase offset. Using the frequency measurements made at A and B, A and/or B are able to solve for the relative velocity between A and B and the frequency offset of the two reference oscillators. Thus there are four measurements: two at A and two at B, with which enable: range, velocity, phase offset and frequency offset—i.e. four unknowns.

Since the signals are transmitted asynchronously by the two devices it is necessary to be able to compensate for changes that take place between the transmission times of the two signals 302 and 304. Assuming a sufficiently stable oscillator this is done by recognising that over a time interval the offset between the two oscillators will change by an amount equal to the frequency offset of the oscillators multiplied by time. Furthermore the range will change by an amount equal to the radial velocity multiplied by time. In this way it is possible to relate the two measurements that were made at different times, and therefore A and B need not transmit their signals at the same time. Furthermore A and B can transmit at any time they like provided that adequate stability criteria for the relationships between phase and frequency offset and range and velocity hold true.

Furthermore multiple sets of measurements can be related in a similar way. Suppose A measures two signals transmitted by B at two different times, the phase and frequency offsets are related according to the time interval between the measurements given a sufficiently stable reference oscillator. Similarly the range and velocity are related to a first order approximation by the time interval between measurements. Combining these with measurements made by B it is clear that eight measurements are now being used to solve for range, range velocity, phase offset and frequency offset. This yields an over determined set of equations from which a best fit solution can be found using standard numerical minimisation algorithms. This leads to a more robust solution which has improved tolerance for errors in the measurements caused by environmental and other interference factors.

Alternatively measurements made by A alone could be used to determine the range to B given that for three signals there are six measurements of which four are independent being used to solve for four unknown variables.

This approach can be extended to combine measurements from more than two signals, in which case further redundancy is introduced yielding even better error tolerance.

The basic system can be extended by making mutual range measurements between 3, 4 or more devices. In this case relative positions and velocities in two or three dimensions can be determined, giving a full x,y,z positioning capability amongst clusters of devices.

Analysis Supporting Range Measurement

Figure 4:
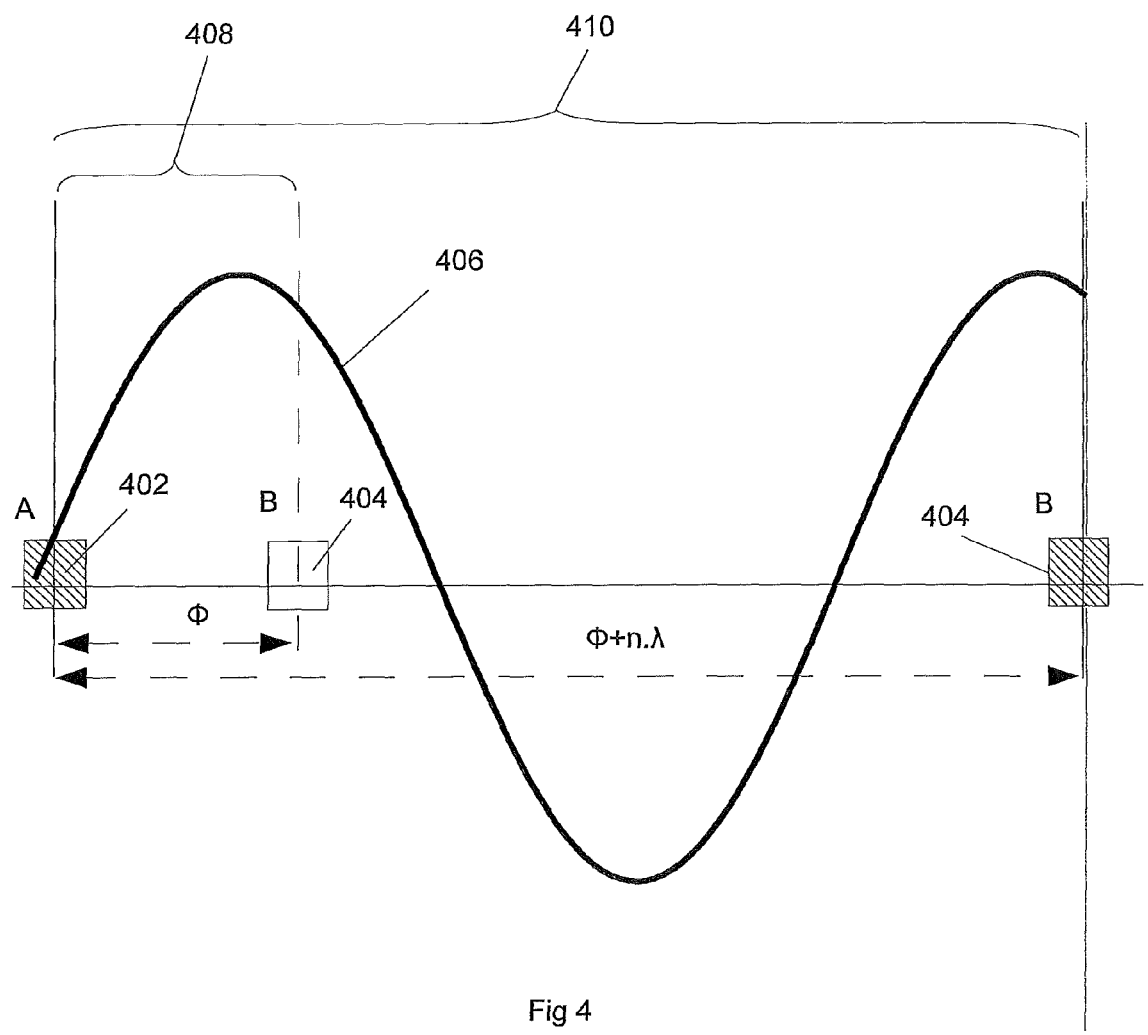
FIG. 4 shows how phase is used to determine range.

Consider two devices A and B, arranged so that A transmits a signal to B. FIG. 4 illustrates how the signal propagates from A 402 to B 404 with the signal 406 drawn as a sinusoid. Assume for now that the clocks of A and B are perfectly synchronised, so that when B measures the signal it measures the phase as $\Phi$ 408. This measured phase represents the distance over which the signal has travelled based on the speed of propagation of the signal. Therefore the range d between A and B can be determined as follows:

$$d = \frac{\Phi}{2 \cdot \pi} \cdot \lambda$$

where $\lambda$ is the wavelength of the signal.

However, measuring only the phase of the signal leads to a cycle ambiguity, so the measured range could actually be the above indicated range plus an integer number of wavelengths 410.

For radio signals propagating in air, the wavelength $\lambda$ is related to the frequency f of the signal and the propagation speed of light a $$f = \frac{c}{\lambda}$$

Thus, for example, a signal transmitted at 2.45 GHz has a wavelength of approximately 12 cm which is useful for short range measurements, but not necessarily for ranges greater than a few wavelengths. In an ideal world one might choose the frequency according to the range that needs to be measured, but this is not practicable in the real world.

Since the system is restricted to using only certain radio bands, the wavelength of which is not necessarily useful for real range measurements, the system described here is normally based on the use of related pairs of tones. Instead of generating just a single tone, the transmitter generates a pair of tones as illustrated in FIG. 2 202 204, and also in FIG. 5 502 504 in which they are depicted as sinusoids propagating between devices A and B. The transmitter 508 transmits signals 502 and 504 which are subtracted to yield 506, the phase of which is measured by the receiving device 510. This measured phase indicates the range 512 that the signal has travelled. Using difference tones gives other advantages than optimising the choice of frequency to use; it inherently eliminates certain common mode effects in the transmit and receive paths, such as arbitrary phase initialisation of local oscillators and thus yields a direct measurement of range. Some of the advantages and reasons for using multiple tones are disclosed in WO0241029 which describes a classical system of using fixed receivers and fixed reference tags in order to track a number of mobile tags.

Figure 5:
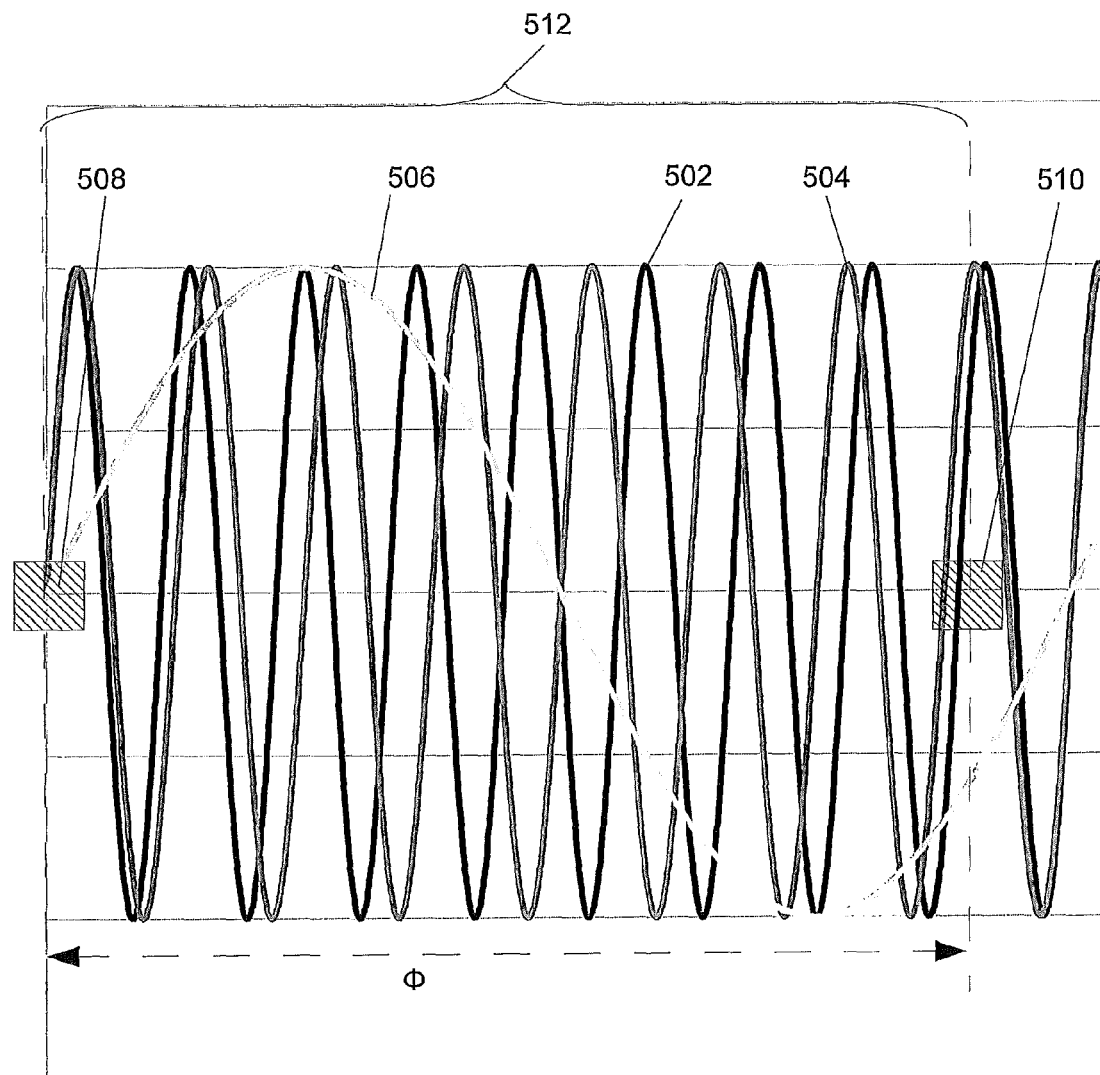
FIG. 5 shows how two signals are combined to give a phase measurement that indicates range independently of the frequency band used.

In addition to measuring the phase of the received signal the second device also measures the frequency difference of the received signal compared with its local reference. It does this by subtracting the received difference signal 506 from a similar signal generated locally using its own clock. It is a well known effect that the frequency of the received signal varies with the relative velocity of the two devices in the direction of the vector connecting them—this is known as the Doppler effect. The amount of change to the received frequency $\Delta f$ introduced by the relative velocity of transmitter and receiver is defined as follows:

$$\Delta f = \frac{f \cdot v}{c}$$

where f is the frequency of the transmitted signal, 502 or 504 in FIG. 5, v is the velocity in a radial direction and c is the speed of light.

In the case of the two devices A and B as described having synchronised clocks the measured frequency offset when they are stationary relative to one another is zero and the measured phase as described above will always be the same. When B is moving towards A, the frequency offset will be negative by an amount reflecting the speed and the measured phase values will be reducing. When B is moving away from A, the frequency offset will be positive by an amount reflecting the speed and the measured phase values will be increasing.

Figure 6:
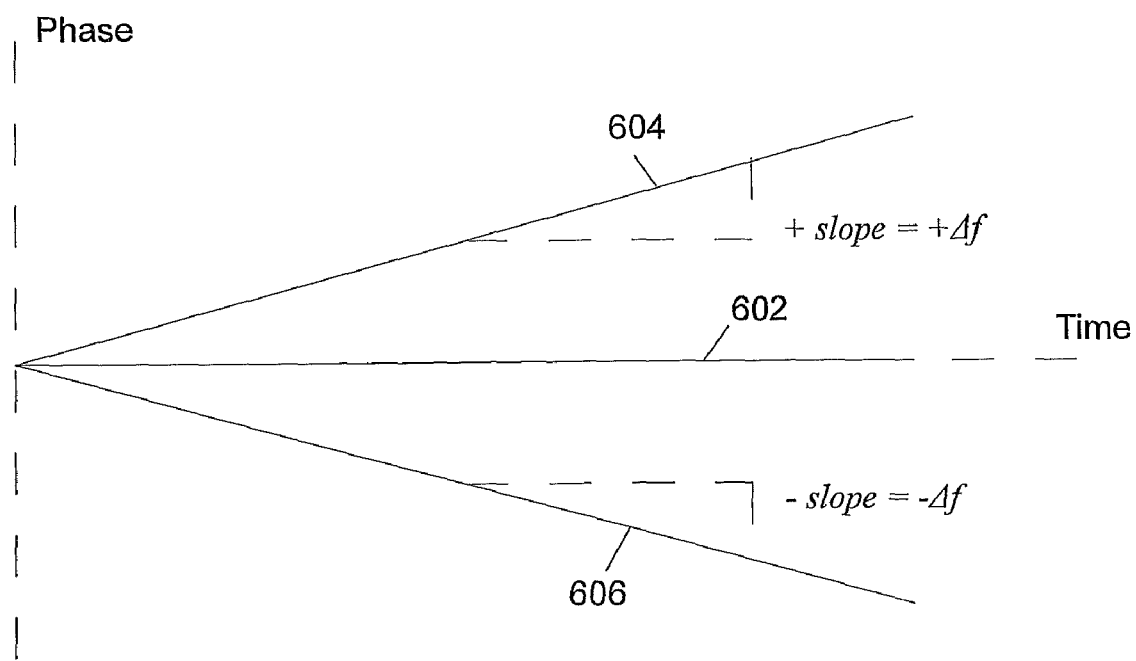
FIG. 6 shows the measurement of frequency offsets.

One way of measuring the relative frequency offset is to use a series of phase measurements, the rate of change, slope, of the series represents the frequency offset. This is depicted in FIG. 6 showing the phase slope (frequency offset) 602 for a stationary situation, a decreasing phase slope 606 (negative Doppler frequency) when the two devices are moving towards one another, and an increasing phase slope 604 (positive Doppler) when the two devices are moving away from one another.

Figure 7:
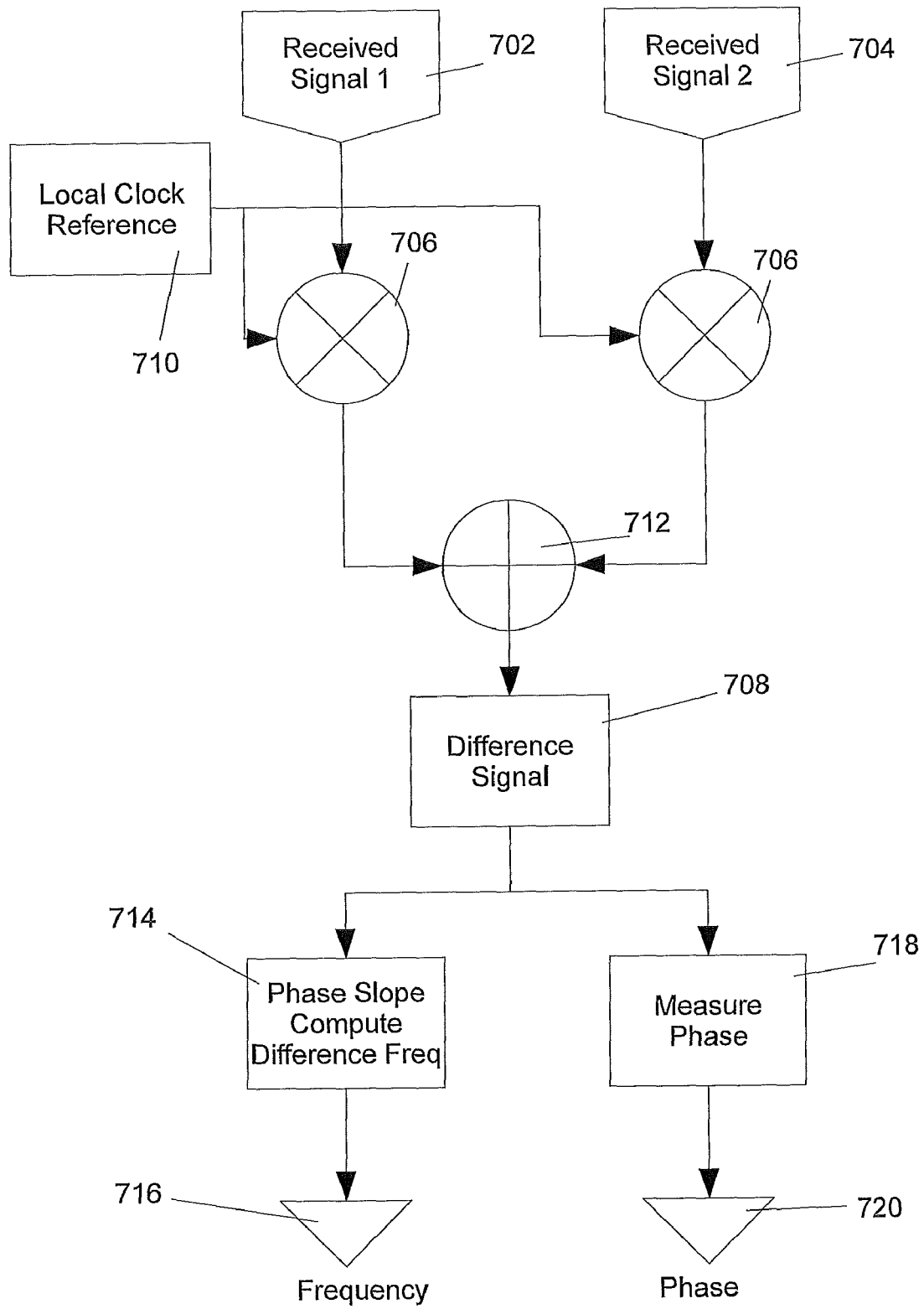
FIG. 7 is a block diagram of received signal processing to extract phase and frequency offsets.

Thus when A sends a signal, which may comprise a single tone or a pair of tones, device B is able to measure the received signal phase, or signal difference phase for two tones, relative to its local clock to provide two measurements: phase and frequency difference. The steps for doing this are illustrated in FIG. 7. The signal is received in an appropriate receiver that outputs the two tones separately 702, 704. A local reference clock 710 is mixed (multiplied) 706 with the received signals which are then subtracted 712 to give the difference signal 708. Different receiver architectures could be used and the solution might involve direct subtraction of the tones as shown, or it could involve converting them to baseband in-phase and quadrature components and then performing a complex FFT (fast Fourier transform) the tones being extracted from the appropriate frequency bins of the output. The difference signal has its phase measured 718, and its frequency measured 714, with both measurements being output 716, 720 for further processing by the location engine which will be described later. There are several techniques that could be used for phase measurement, including use of a phase locked loop, measurement through a complex FFT (fast Fourier transform) process or direct measurement using a polyphase digital filter bank. These techniques are described in the technical literature and are well understood by those experienced in the art and therefore the specifics of these alternative receiver architectures will not be described any further here.

In practice devices A and B each have their own reference oscillators which are not synchronised. The relative phases and frequencies of the two reference oscillators at the time of measurement are not known.

Suppose that at the time of measurement the reference oscillator at device B can be represented as follows:

$$f_B = f_A + \zeta$$

where $f_A$ is the frequency of device A and $f_B$ the frequency of device B and $\zeta$ is the offset between the two, and $$\Phi_B(t) = \Phi_A(t) + \theta(t)$$

describes the phase relationship between the two.

The signal is transmitted from A to B which introduces a phase offset due to the distance travelled F(d) so when the received signal is measured using the local oscillator at B the resultant measured phase is given by:

$$\Phi_m(t) = \Phi_A(t) + \theta(t) + F(d)$$

and the measured frequency difference of:

$$\Delta f_m = \Delta f + \zeta$$

Assume that this signal is transmitted at time $t_1$ and that the system is using a radio signal, incorporating the conversions for distance and velocity described above and rearranging the equations yields:

$$d(t_1) = \frac{\lambda}{2 \cdot \pi} \cdot [\Phi_m(t_1) - \theta(t_1)] \quad (1)$$

$$v(t_1) = \frac{c}{f} \cdot (\Delta f_m(t_1) - \zeta) \quad (2)$$

At time $t_2$ device A transmits another signal to B:

$$d(t_2) = \frac{\lambda}{2 \cdot \pi} \cdot [\Phi_m(t_2) - \theta(t_2)] \quad (3)$$

$$v(t_2) = \frac{c}{f} \cdot (\Delta f_m(t_2) - \zeta) \quad (4)$$

Provided that the two oscillators are sufficiently stable (the change in frequency offset is small in comparison to the measurement resolution) over the interval between $t_1$ and $t_2$ the two unknown phase offsets are related as follows:

$$\theta(t_2) = \theta(t_1) + (t_2 - t_1) \cdot \zeta$$

Similarly provided that relative motion of the devices is sufficiently constant, $v(t_1) = v(t_2) = v$ over the interval between $t_1$ and $t_2$ the distance and velocity are related as follows:

$$d(t_2) = d(t_1) + v \cdot t$$

However in this case equations (2) and (4) are singular, so it is necessary to make an additional set of measurements at $t_3$:

$$d(t_3) = \frac{\lambda}{2 \cdot \pi} \cdot [\Phi_m(t_3) - \theta(t_3)] \quad (5)$$

$$v(t_3) = \frac{c}{f} \cdot (\Delta f_m(t_3) - \zeta) \quad (6)$$

Combining these six equations with the stated relationship assumptions leads to a set of four independent equations with four unknown variables: v, $d(t_1)$, $\zeta$ and $\theta(t_1)$. This set of simultaneous equations can be solved directly using conventional linear algebra. This therefore yields the distance and velocity between the two devices as well as a measure of the frequency offset and the absolute phase offset, which means that in the process of locating the devices relative to one another the system has also achieved accurate time synchronisation and/or time transfer.

In the case that the two devices are connected by a cable, the system provides accurate time transfer which may be useful for distributing reference clocks over wired networks. Clearly in this case the propagation speed, c, needs to be adjusted to take into account the speed at which the signal propagates along the cable, but only if an accurate estimate of cable length is required.

In the event that the relative velocities are changing significantly between measurements it may be necessary to model the motion to a second or higher degree. In this case it may be necessary to make more than three signal measurements. With three signals there are six measurement parameters and provided the device motion can be adequately described using no more than four unknowns the equation set may be solvable.

In practice it may be beneficial to use more signal measurements than necessary allowing an equation set with more measurements than unknown variables. In this case the problem is typically solved using a minimisation technique, in which a continuous cost function is constructed and solved using iterative numerical techniques. For example a set of n signal measurement sets might be combined into the following cost function using a constant velocity assumption:

$$F = \sum_{i=1}^{n} \left[ \frac{2 \cdot \pi}{\lambda} \cdot (d(t_1) + V \cdot (t_i - t_1)) + \theta t_1 + \zeta \cdot (t_i - t_1) - \Phi_m(t_i) \right]^2$$

where:

$$V = \sum_{i=1}^{n} \left[ \frac{c}{f} \cdot (\Delta f_m(t_i) - \zeta) \right]$$

For $n \geq 3$ the solution which minimises F gives a least squares estimate of the unknown parameters.

Different cost functions can be constructed depending on the way in which the relationship between the distance and velocity is modelled. Those trained in the art will be familiar with techniques for constructing a cost function suitable for use in a numerical minimisation technique for solving.

The above description is for a one-way system in which a receiver computes the range and time offset of a transmitter based on receiving 3 or more related signals. However, consider the two-way system in FIG. 3 arranged so that at time $t_1$ device A transmits 302 to device B, then at time $t_2$ device B transmits 304 to device A. Between the two transmissions is a time delay 306. There is no need to know this time delay accurately and the two transmissions may happen independently. The measurements made by each are sent to the other, so B sends the measurements it makes of A's signal to A 308 and A sends the measurements it makes of B's signal to A 310. Therefore both devices have the measurements made by themselves and the other, receiving, device.

The following measurements result:

$$d(t_1) = \frac{\lambda}{2 \cdot \pi} \cdot [\Phi_m(t_1) - \theta(t_1)] \quad (7)$$

$$v(t_1) = \frac{c}{f} \cdot (\Delta f_m(t_1) - \zeta) \quad (8)$$

$$d(t_2) = \frac{\lambda}{2 \cdot \pi} \cdot [\Phi_m(t_2) + \theta(t_2)] \quad (9)$$

$$v(t_2) = \frac{c}{f} \cdot (\Delta f_m(t_2) + \zeta) \quad (10)$$

These are the same as for the one way system except that the signs of the phase and frequency offsets are inverted for the second pair of equations. Assuming constant velocity over the interval of the measurements it can be seen that a trivial and direct solution for $\zeta$ and v are possible simply by subtracting (8) from (10) and solving directly for $\zeta$.

In a similar way to that demonstrated before (7) and (9) are linked using v and $\zeta$.

The time offset between the two signal transmissions, $t_2-t_1$, does not appear in the time-of-flight calculations—only in the adjustments for movement and phase roll between the two oscillators. Both of these are slow moving parameters at least 6 orders of magnitude smaller than the speed of light, and this renders the system insensitive to this time delay and variations in it—a significant advantage over most competing systems which need to characterise the delay very accurately.

This bi-directional system can easily be extended to incorporate multiple measurements in both directions, using them to construct a cost function, in a similar way to that described earlier, with significant amounts of redundancy, which helps to manage measurement and environmentally induced errors. In the simplest form this results from the averaging effect of using multiple measurements.

Ranging Using Other Media

The system described above is for measurement of range between two devices and for accurate time transfer between them using radio signals transmitted wirelessly. This can be achieved using bi-directional signal transmission or multiple one-way transmissions. The use of dual-tone signals gives the system the flexibility to be tailored to a wide range of different applications using available radio spectrum. This flexibility also enables the system to be applied to cabled systems where signal transmission is across physical wires, and to systems using other media—such as sonar or acoustic signals.

In the case of an acoustic system operating in air it is desirable to operate in the ultrasonic band (typically around 40 kHz) which has a wavelength of under 1 cm. The system can be applied to this application equally effectively by using dual-frequency signals. Similarly it can be applied to sonar system with appropriate adaptation for frequency of use and choice of tones and tone spacing.

Application to Spatial Positioning

However, an important application of the system is for spatial positioning. Given 3 devices each able to measure the range to the other two, yields a triangle with the lengths of all three sides known, and therefore the relative positions (and velocities) of the three devices on a two-dimensional plane can be determined. Similarly with four devices each one being able to measure the range to the other three defines a 3-dimensional tetrahedron and defines the relative positions (and velocities) of the four devices.

Figure 8:
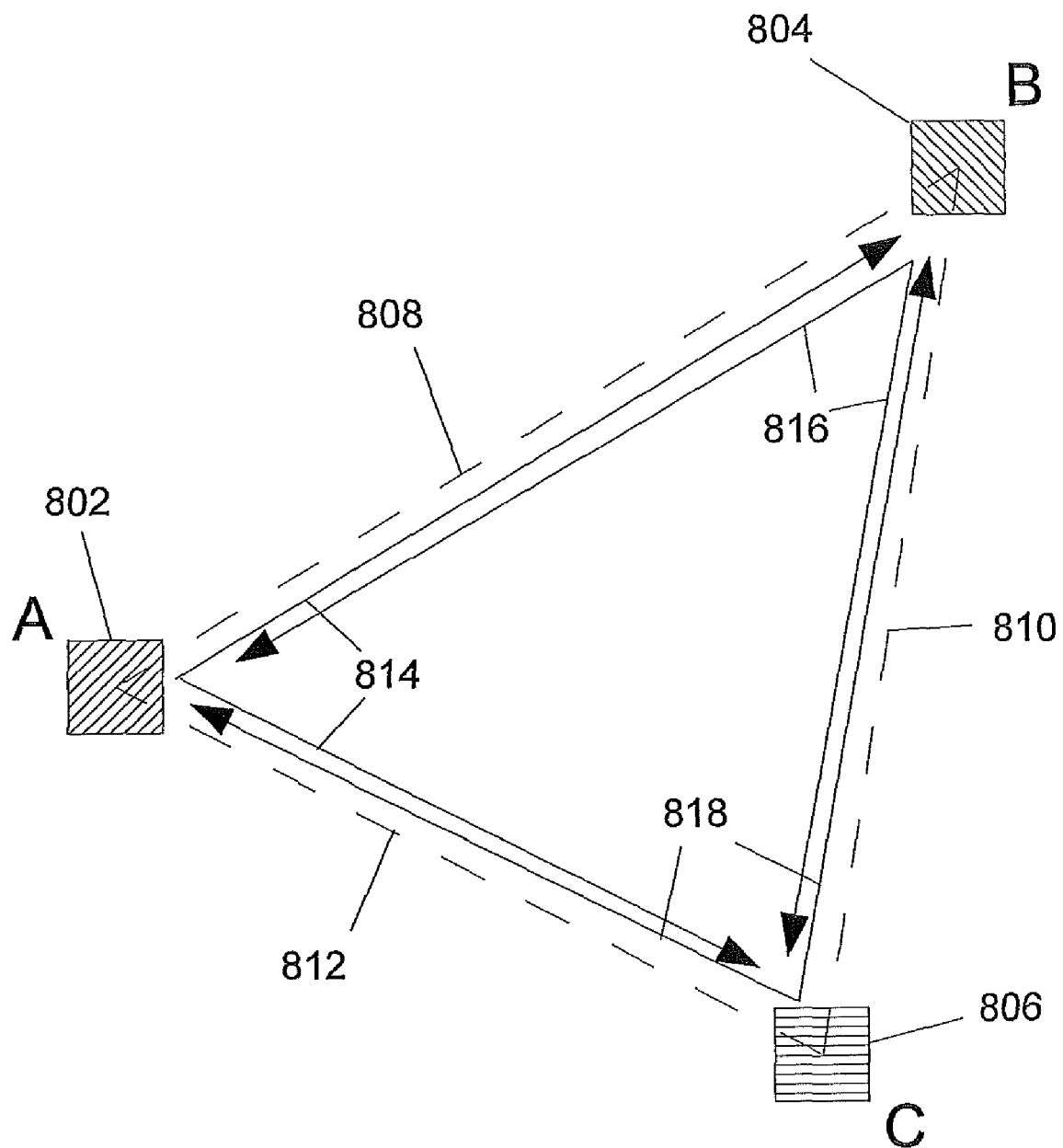
FIG. 8 is an arrangement of three devices illustrating 2-dimensional positioning.

Consider the situation in FIG. 8 in which three devices A, 802, B, 804 and C, 806, having ranges $d_{ab}$ 808, $d_{bc}$ 810 and $d_{ca}$ 812 separating them. Let each one in turn send a signal to the other two—A sends to B & C, 814, B sends to A & C, 816, and C sends to A & B, 818.

Since the signals sent by each device are asynchronous and at a different time, let the times at which these signals are sent be $t_1$, $t_2$ and $t_3$ for A, B and C respectively. This gives six sets of measurements a follows:

$$d_{ab}(t_1) = \frac{\lambda}{2 \cdot \pi} \cdot [\Phi_{am}^b(t_1) - \theta_{ab}(t_1)] \quad 11$$

$$v_{ab}(t_1) = \frac{c}{f} \cdot (\Delta f_{am}^b(t_1) - \zeta_{ab}) \quad 12$$

$$d_{ab}(t_2) = \frac{\lambda}{2 \cdot \pi} \cdot [\Phi_{bm}^a(t_2) + \theta_{ab}(t_2)] \quad 13$$

$$v_{ab}(t_2) = \frac{c}{f} \cdot (\Delta f_{bm}^a(t_2) + \zeta_{ab}) \quad 14$$

$$d_{bc}(t_2) = \frac{\lambda}{2 \cdot \pi} \cdot [\Phi_{bm}^c(t_2) - \theta_{bc}(t_2)] \quad 15$$

$$v_{bc}(t_2) = \frac{c}{f} \cdot (\Delta f_{bm}^c(t_2) - \zeta_{bc}) \quad 16$$

$$d_{bc}(t_3) = \frac{\lambda}{2 \cdot \pi} \cdot [\Phi_{cm}^b(t_3) + \theta_{bc}(t_3)] \quad 17$$

$$v_{bc}(t_3) = \frac{c}{f} \cdot (\Delta f_{cm}^b(t_3) + \zeta_{bc}) \quad 18$$

$$d_{ca}(t_3) = \frac{\lambda}{2 \cdot \pi} \cdot [\Phi_{cm}^a(t_3) - \theta_{ca}(t_3)] \quad 19$$

$$v_{ca}(t_3) = \frac{c}{f} \cdot (\Delta f_{cm}^a(t_3) - \zeta_{ca}) \quad 20$$

$$d_{ca}(t_1) = \frac{\lambda}{2 \cdot \pi} \cdot [\Phi_{am}^c(t_1) + \theta_{ca}(t_1)] \quad 21$$

$$v_{ca}(t_1) = \frac{c}{f} \cdot (\Delta f_{am}^c(t_1) + \zeta_{ca}) \quad 22$$

This set of twelve equations contains twelve unknowns and twelve independent measurements and can thus be solved through direct algebraic substitution and elimination. However, the phase and frequency offsets are related:

$$\theta_{ab}+\theta_{bc}+\theta_{ca}=0$$

$$\zeta_{ab}+\zeta_{bc}+\zeta_{ca}=0$$

and thus there are really only ten independent unknowns. A better method of solving the equation set is therefore to construct a cost function, similar to that presented for the two-device range measurement, and use a numerical minimisation approach. Although more computationally intensive this approach extends easily and flexibly to the situation in which there are more than 3 devices or to situations in which the reciprocal connectivity amongst a cluster of devices is incomplete. Methods for constructing a cost function and solving the general problem will be described later.

However, in order to solve the problem, the device which does so needs to have the measurements made at all three devices.

Figure 9:
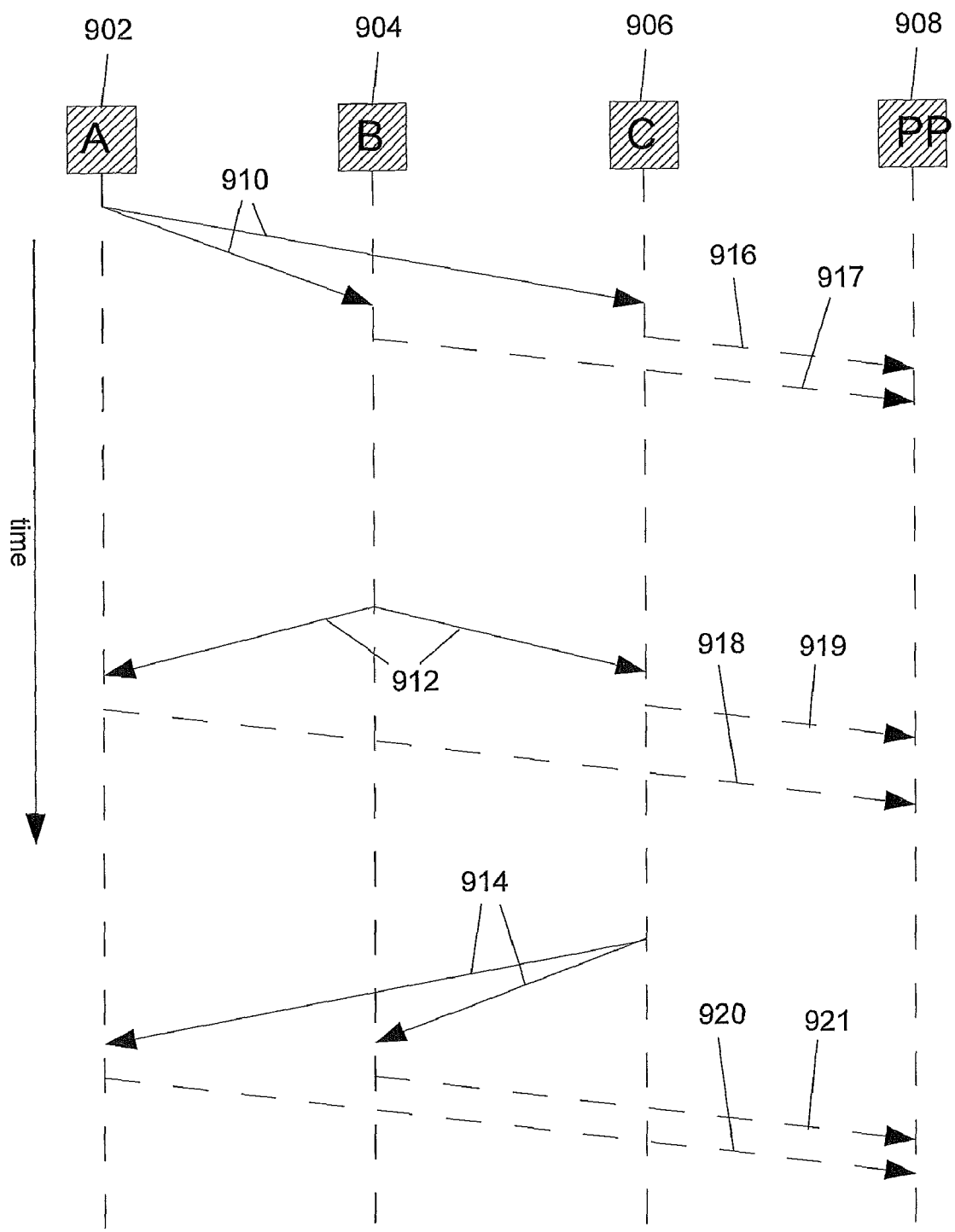
FIG. 9 shows message flows for measurement data to a separate position processing device.

One approach is for each device to send its measurements to a separate Position Processor for computation of the positions, velocities, phase and frequency offsets—typically using a wireless communications link. This is shown using a message flow chart in FIG. 9. At a first time Device A, 902, transmits a signal 910 to B 904 and C 906. B measures the signal and transmits the measurement 917 to the Position Processor 908. C measures the signal and transmits the measurement 916 to the Position Processor 908. At a second time B 904 transmits its signal 912 to A 902 which measures it and sends the measurement 918 to the Position Processor 908, and to C 906 which measures it and sends the measurement 919 to the Position Processor 908. At a third time C 906 transmits its signal 914 to A 902 which measures it and sends the measurement 920 to the Position Processor 908, and to B 904 which measures it and sends the measurement 921 to the Position Processor 908. The Position Processor 908 now has all the necessary measurements to solve the problem described above.

Figure 10:
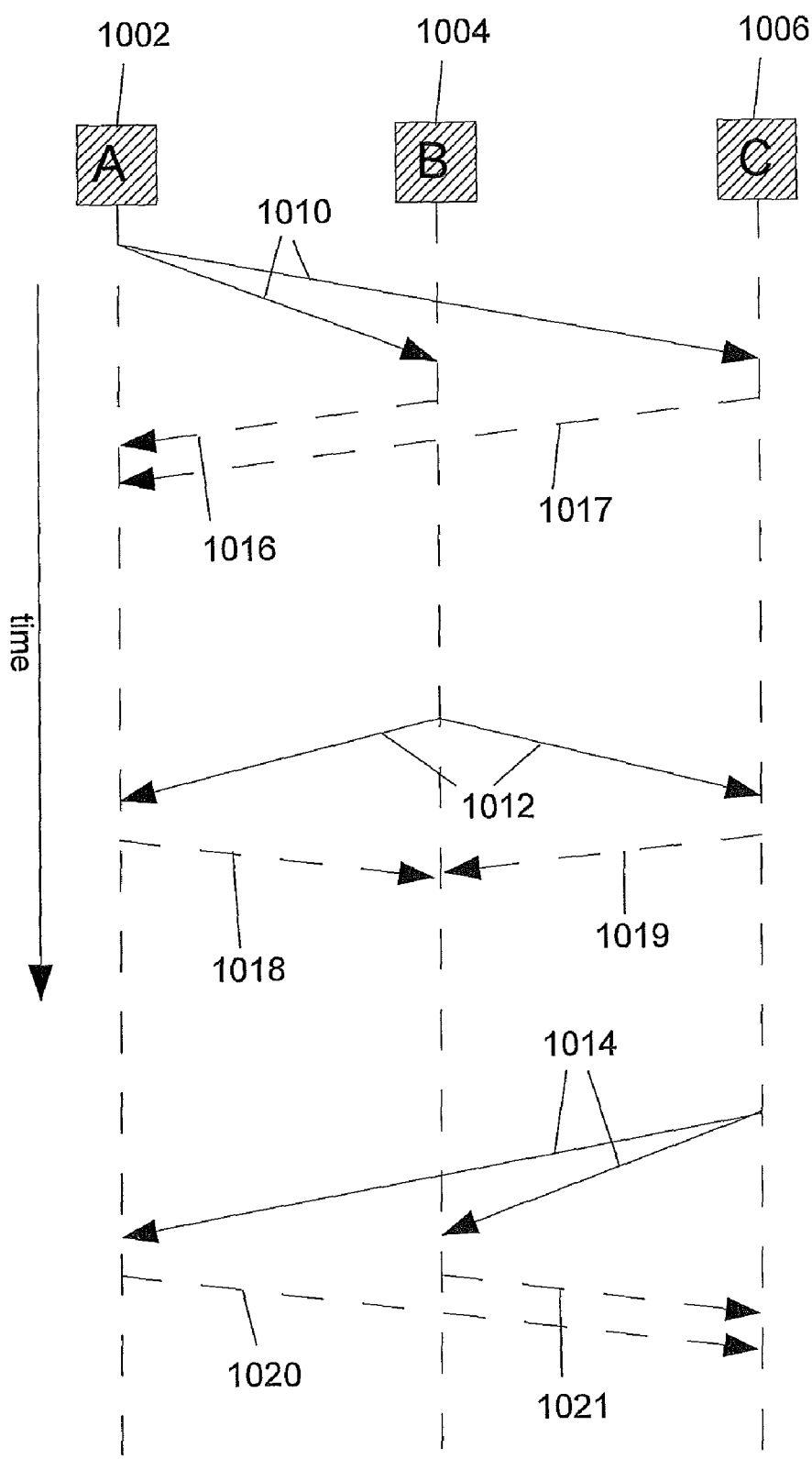
FIG. 10 shows message flows in which individual measurements are sent back to the signal originator to enable it, and each device, to compute its own position.

A second approach is for each device to send its measurements back to the devices for which the measurements were made. This approach is shown as a message flow chart in FIG. 10. At a first time Device A, 1002, transmits a signal 1010 to B 1004 and C 1006. B measures the signal and transmits the measurement 1016 back to A 1002. C measures the signal and transmits the measurement 1017 back to A 1002. At a second time B 1004 transmits its signal 1012 to A 1002 which measures it and sends the measurement 1018 back, and to C 1006 which measures it and sends the measurement 1019 back. At a third time C 1006 transmits its signal 1014 to A 1002 which measures it and sends the measurement 1020 back, and to B 1004 which measures it and sends the measurement 1021 back to C 1006. All of the devices now have the necessary measurements for any or all of them to solve the ranges to neighbours, although this is not necessarily sufficient for a completely general solution of the problem described. For example A knows the ranges to B and C, but without knowing the range between B and C a full solution of the position is not possible. However, it is easy for each device to include in the measurement message additional data reporting its measurements of other neighbours, or their ranges.

In the first two approaches the communications channel used to send the measurements is logically separate from the channel used to send the range signals, and in practice it is likely to be a physically separate channel, probably using a different radio band and communications protocols, although the two logical channel could coexist within the same physical channel.

Figure 11:
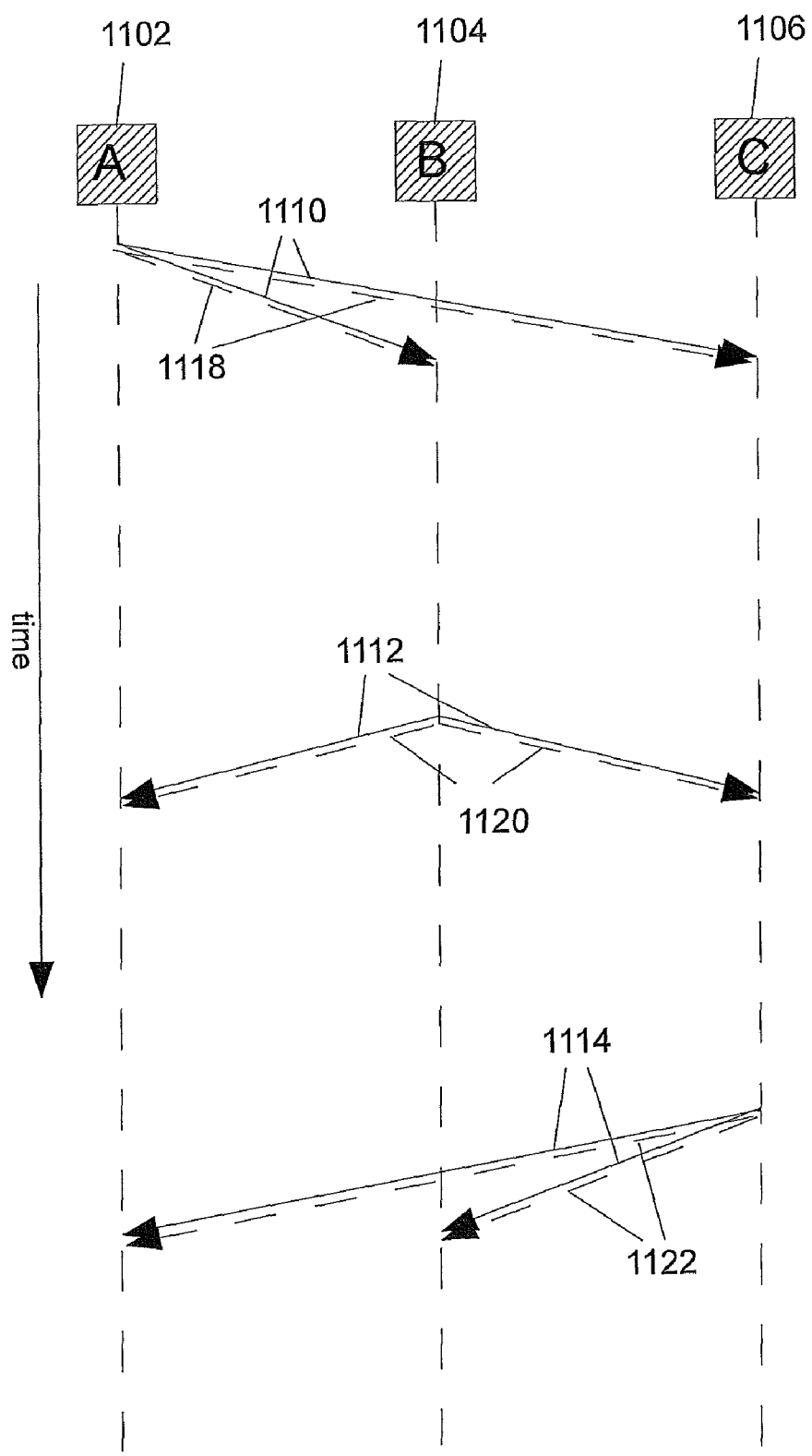
FIG. 11 shows a broadcast mode in which devices broadcast the data messages containing measurements of neighbours.

A third approach is to use the same communications channel by combining the range signals and the signal measurements so that any device receiving the communication would be able to make measurements of the signal received and it would at the same time receive measurements made by the device sending the signal, including measurements of other neighbours of the sending device. FIG. 11 illustrates this approach as a message flow chart. At a first time device A 1102 sends it signal 1110 plus any previous measurements 1118 it made of neighbouring devices to B 1104 and C 1106. At a second time device B 1104 sends its signal 1112 plus any previous measurements 1120 it has made of neighbour signals to devices A 1102 and C 1106. At a third time device C 1106 sends its signal 1114 plus any previous measurements 1122 of neighbouring device signals to devices A 1102 and B 1104. On the first pass through this signal exchange cycle the devices may not have any previous measurements to report, but after a second iteration has completed, all the devices have a full set of measurements needed to solve the equations presented earlier. This approach introduces a latency of one complete signal cycle and therefore time critical applications may prefer to use one of the earlier approaches at the expense of using a second communications channel.

Application to More than Three Devices

Figure 12:
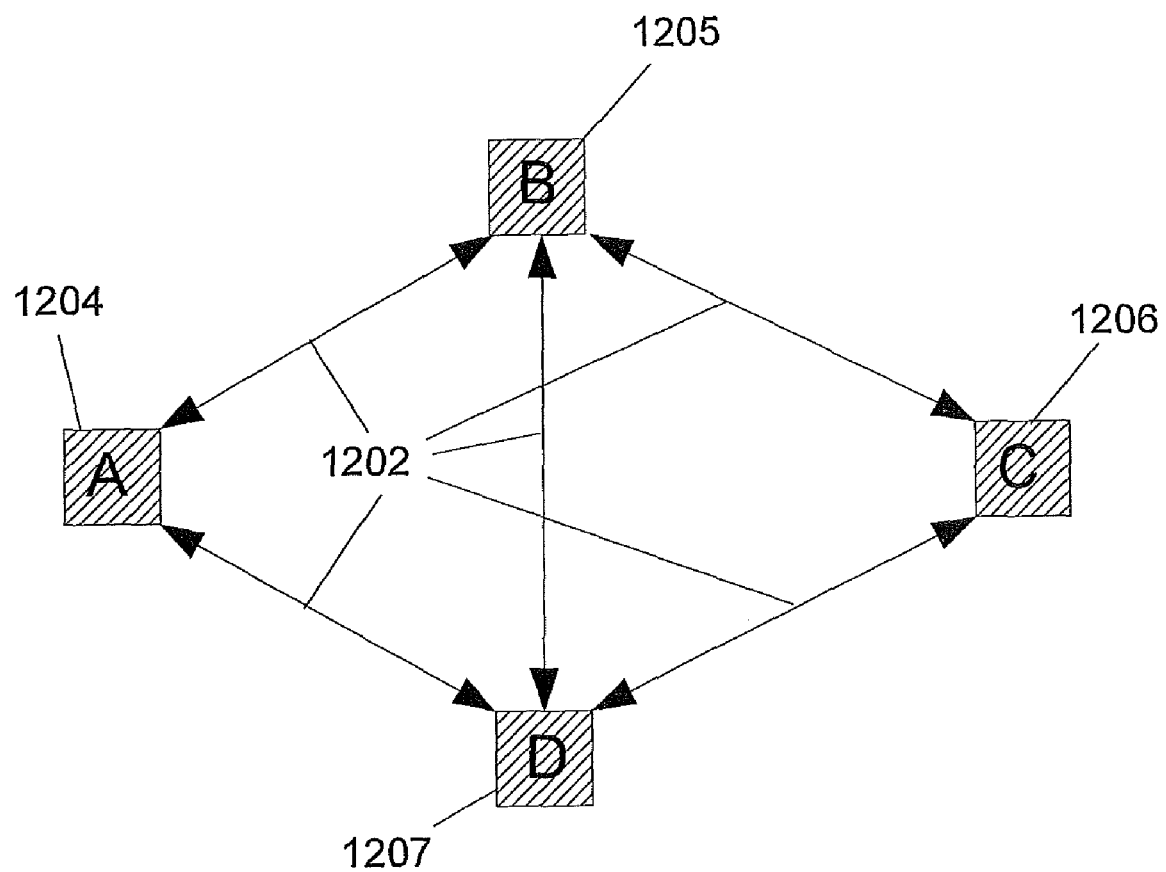
FIG. 12 shows a cluster of four devices that are not fully interconnected to illustrate sufficiency of measurement data for solving position, velocity and clock offsets.

Consider the two-dimensional network of 4 devices in FIG. 12. The devices are able to exchange signals and measurements 1202 with some of their neighbours. Each link between two devices indicates that each can send its signal to the other and receive the signal transmitted by the other. It is assumed that exchange of measurement data is "in band" which means that whenever a device broadcasts its signal the transmission includes a data payload containing the most recent set of measurements it has made of all its neighbour devices. The network depicted is not fully interconnected. Device A 1204 is linked with B 1205 and D 1207; B 1205 with A 1204, C 1206 and D 1207; C 1206 with B 1205 and D 1207; and D 1207 with A 1204, B 1205 and C 1206. Devices A 1204 and C 1206 are not connected. This arrangement is chosen to show how the relative positions and speeds in two dimensions can be computed by treating the four devices as a cluster.

Figure 13:
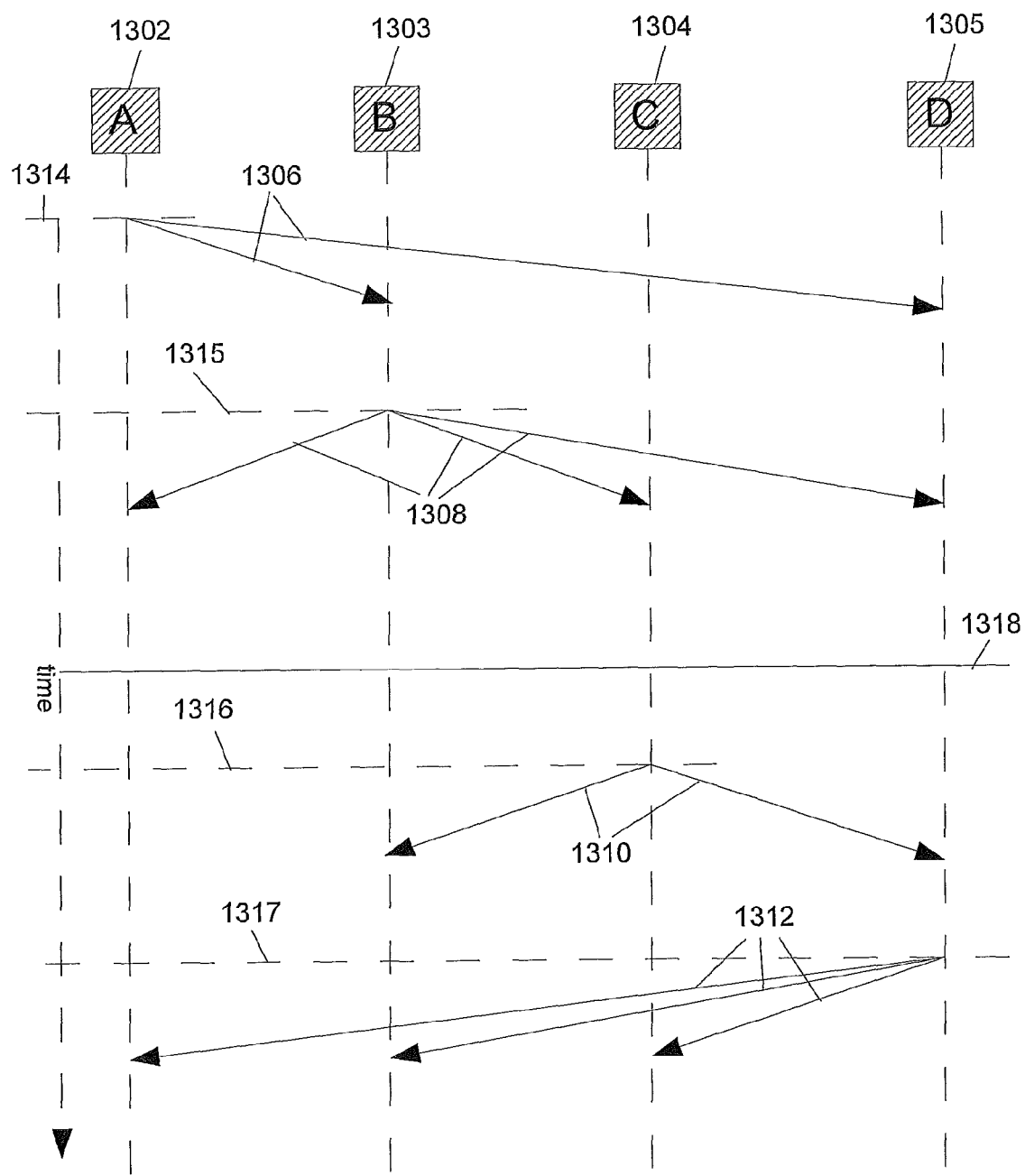
FIG. 13 is a message flow diagram for the network of FIG. 12.

FIG. 13 shows how the signals are transmitted and received in time. At time $t_1$ 1314 A 1302 broadcasts a signal and measurement data 1306 to B 1303 and D 1305. At time $t_2$ 1315 B 1303 broadcasts a signal and measurement data 1308 to A 1303, C 1304 and D 1305. At time $t_3$ 1316 C 1304 broadcasts a signal and measurement data 1310 to B 1303 and D 1305. At time $t_4$ 1317 D 1305 broadcasts a signal and measurement data 1312 to A 1302, B 1303 and C 1304. In order to relate the measurements to one another a reference time $t_0$ 1318 has been defined.

Using this information we can construct the problem space for a cluster of devices by using the generic indices i, j and k as follows:

At time $t_k$ device j measures the phase $\phi$ and frequency $\gamma$ of the signal transmitted by device i. However the two devices have unknown phase $\theta$ and frequency $\zeta$ offsets between their respective clocks. We use the convention $\theta_i^j$ to indicate the phase offset of device j relative to i. They also have a distance d between them and radial velocity v relative to one another. We use the convention $d_{ij}$ to represent the distance between devices i and j.

Assuming a first order approximation over the measurement period the parameter values at the different signal times can be related back to the reference time as follows:

$$d_{ij}(t_k) = d_{ij}(t_0) + (t_k - t_0) \cdot v_{ij}(t_0) : d_{ij} = d_{ji}, d_{ii} = 0$$

$$v_{ij}(t_k) = v_{ij}(t_0) : v_{ij} = v_{ji}, v_{ii} = 0$$

$$\theta_i^j(t_k) = \theta_i^j(t_0) + (t_k - t_0) \cdot \zeta_i^j(t_0) : \theta_i^j = -\theta_j^i, \theta_i^i = 0, \theta_i^k = \theta_j^k + \theta_i^j$$

$$\zeta_i^j(t_k) = \zeta_i^j(t_0) : \zeta_i^j = -\zeta_j^i, \zeta_i^i = 0, \zeta_i^k = \zeta_i^j + \zeta_j^k$$

Arranging the times $t_k - t_0$ in matrix form $\underline{t}$ we can generalise these relationships as:

$$\underline{d} = \underline{\hat{d}} + \underline{t} \cdot \underline{\hat{v}} \qquad (23)$$

$$\underline{v} = \underline{\hat{v}} \qquad (24)$$

$$\underline{\theta} = \underline{\hat{\theta}} + \underline{t} \cdot \underline{\hat{\zeta}} \qquad (25)$$

$$\underline{\zeta} = \underline{\hat{\zeta}} \qquad (26)$$

in which the distances, velocities, phase and frequency offsets at the times of the measurements being made are all related back to the values of these parameters at the reference time, the referenced values being indicated by the ˆ (caret) symbol. The matrices are square with the numbers of rows and columns being equal to the number of devices in the cluster.

Multiplication by the time matrix is performed element by element and is not a matrix multiplication.

Assembling the measurement equations:

$$\varphi_i^j = d_{ij} \cdot \frac{2 \cdot \pi}{\lambda} + \theta_i^j$$

$$\gamma_i^j = \frac{f \cdot v_{ij}}{c} + \zeta_i^j$$

normalising to the reference time by substituting in the relationships above and putting into matrix form and collecting error terms caused by measurement errors and non-linearity in the assumptions to the left side yields the following:

$$\underline{\delta} = \underline{\varphi} - \frac{2 \cdot \pi}{\lambda}(\underline{\hat{d}} + \underline{t} \cdot \underline{\hat{v}}) - (\underline{\hat{\theta}} + \underline{t} \cdot \underline{\hat{\zeta}}) \quad 27$$

$$\underline{\varepsilon} = \underline{\gamma} - \frac{f}{c} \cdot \underline{\hat{v}} - \underline{\hat{\zeta}} \quad 28$$

The range values can be transformed into a function of the positions of the devices as follows:

$$d_{ij} = \sqrt{(x_j - x_i)^2 + (y_j - y_i)^2}$$

and similarly the relative radial velocity can be expressed as a function of the Cartesian velocities and coordinates of the two devices, for example by noting that the radial velocity is equal to the vector dot product of the relative velocity and the unit vector in the direction linking the two devices:

$$v_r = \underline{v} \cdot \underline{u}$$

where:

$$\underline{v} = ((vx_j - vx_i)\cos(\theta), (vy_j - vy_i)\sin(\theta)),$$

$$\theta = \operatorname{atan}\left[\frac{(vy_j - vy_i)}{(vx_j - vx_i)}\right]$$

$$\underline{u} = \left(\frac{x_j - x_i}{|d_{ij}|}, \frac{y_j - y_i}{|d_{ij}|}\right)$$

Using the measurement symmetry relationships it is easily shown that for an interconnected cluster of n devices:

There are n−1 independent unknown phase offsets ϕ
There are n−1 independent unknown frequency offsets γ
The unknown ranges can be reduced to 2n−3 unknown positions (x,y)
The unknown velocities can be reduced to 2n−3 unknown velocities (vx, vy)
There are up to 2n(n−1) measurements In the case of the partially interconnected cluster of four devices (n=4) shown in FIG. 12 there are 16 unknowns and 20 measurements (from a possible 24 since no measurements are made between devices A 1204 and C 1206).

Since the problem described contains more measurements than unknowns it is best solved using a numerical minimisation technique: for example a variable metric method such as that after Broyden-Fletcher-Goldfarb-Shanno (BFGS). In this case a cost function is constructed from the two error functions [27] and [28] above. A simple cost function would be a weighted sum of the Frobenius norms of the two error matrices:

$$F = \|\underline{\delta}\| + w \cdot \|\underline{\varepsilon}\| \quad 29$$

within which w is a weighting factor facilitating summing error terms from two sets of equations using different measurement types and scales. This weighting factor manages the relative importance of phase measurements and frequency measurements, and is typically chosen to have a value that leads to error terms having similar statistical mean for the particular characteristics of the measurement errors in the target system.

The method of constructing a cost function to minimise the function errors and using a numerical method to find the function minimum is well understood by those practised in the art, and many different methods could be used such as BFGS in the example above, downhill simplex methods, conjugate gradients, or variable metric methods.

Using Multiple Sets of Signal Measurements

The robustness of the overall solution is further enhanced by combining several measurements from each device using the principles described for the range measurement situation. In this case it is possible to relate successive positions using velocity and successive phase offsets using the frequency offset.

Generalising for a set of measurements m we can rewrite equation 29 as follows:

$$F^m = \|\underline{\delta}^m\| + w \cdot \|\underline{\varepsilon}^m\| \quad 30$$

in which:

$$\underline{\delta}^m = \underline{\varphi}^m - \frac{2 \cdot \pi}{\lambda}(\underline{\hat{d}} + \underline{t}^m \cdot \underline{\hat{v}}) - (\underline{\hat{\theta}} + \underline{t}^m \cdot \underline{\hat{\zeta}})$$

and $$\underline{\varepsilon}^m = \underline{\gamma}^m - \frac{f}{c} \cdot \underline{\hat{v}} - \underline{\hat{\zeta}}$$

with all m equations being reference to a single common time.

So for multiple sets of measurements m assuming that the relationships between distance and velocity and phase and frequency offsets hold true over the time span of the measurement sets we can construct a unified cost model for the m measurement sets:

$$F = \sum_{k=0}^{m} p^k \cdot [\|\underline{\delta}^k\| + w \cdot \|\underline{\varepsilon}^k\|] \quad 31$$

in which we might assign each measurement set a weight $p^k$ based upon the value or importance of that measurement set within the whole. For example measurement sets further away in time from the normalised common time might have proportionally lower weight or measurement sets containing fewer measurements to neighbouring devices might have lower weight. In a basic implementation all values of $p^k$ would have the value 1.

Since the assumptions relating distance and velocity (equations 23, 24) and phase and frequency offsets (equations 25, 26), being first order approximations in which the velocity and frequency offset are assumed to be constant over the time interval spanning the measurements, only hold true when the measurement interval is much shorter than the rates at which the parameters change this could restrict their usefulness, especially if it is desirable to include a reasonable number of measurement sets in the cost model.

One way of solving this problem is to construct a higher order, for example $2^{nd}$ or $3^{rd}$ order, model linking velocity to distance and phase to frequency. A second order model would introduce a constant acceleration and a constant rate of change of frequency offset, as follows:

$$d = \hat{d} + \hat{v} \cdot t + \frac{1}{2} \cdot \hat{a} \cdot t^2$$

$$v = \hat{v} + \hat{a} \cdot t$$

$$\underline{\theta} = \underline{\hat{\theta}} + \underline{\hat{\zeta}} \cdot t + \frac{1}{2} \cdot \underline{\hat{\rho}} \cdot t^2$$

$$\underline{\zeta} = \underline{\hat{\zeta}} + \underline{\hat{\rho}} \cdot t$$

A third order model would introduce a constant rate of change of acceleration, sometimes referred to as jerk, in the equations. In practice $2^{nd}$ and higher order models are more useful for the motion model of the object being located (velocity and distance) than for modelling the oscillator changes, because it is generally easier to implement an oscillator that is stable over most practical measurement intervals than to model the device motion.

Another approach is to use motion models that are stable across sequential pairs of measurement sets, or across sets of measurements that span a maximum time window, and to introduce constraints between the pairs of measurement sets or linking those that fall within the time window.

A direct approach to implementing such as method is to select the m measurement sets used in the cost model of equation 31 by using only those that lie within the target time interval or the required number of measurement sets to use. Therefore this approach works by collecting as many measurement sets that fall within the defined time interval as possible, but potentially capped by a maximum number that can be combined at once (memory, processing or other constraint), and using these to formulate the cost model according to equation 31 and solving for the unknowns.

Another more general approach to solving multiple measurements sets is to treat each one as a separate set of equations as per equation 30 with each equation set referenced to its own base time $T_m$, then constrain their solutions by using the relationship equations 23 to 26 as applied to the reference times for each measurement set:

$$\hat{d}^{m+1} - \hat{d}^m = (T_{m+1} - T_m) \cdot \frac{\hat{v}^{m+1} + \hat{v}^m}{2}$$

$$\hat{v}^{m+1} = \hat{v}^m$$

$$\underline{\hat{\theta}}^{m+1} - \underline{\hat{\theta}}^m = (T_{m+1} - T_m) \cdot \frac{\underline{\hat{\zeta}}^{m+1} + \underline{\hat{\zeta}}^m}{2}$$

$$\underline{\hat{\zeta}}^{m+1} = \underline{\hat{\zeta}}^m$$

These equations which relate the solutions of the m and m+1$^{th}$ measurement sets could be used as boundary constraints of either hard or soft character, or they could be rearranged to yield an additional cost component in a combined cost model for the m and m+1 measurements sets.

This approach could be extended to span multiple measurement sets, or multiple pairs of measurements sets as long as those that are being linked fall within the time span over which the underlying assumptions hold sufficiently accurate. The general techniques for the construction of cost models and boundary conditions for solving equation sets numerically are well documented in published literature including engineering books such as "Numerical Recipes in C++—The Art of Scientific Computing—by Press, Teukolsky, Vetterling and Flannery".

Three-Dimensional Clusters of Devices

Figure 14:
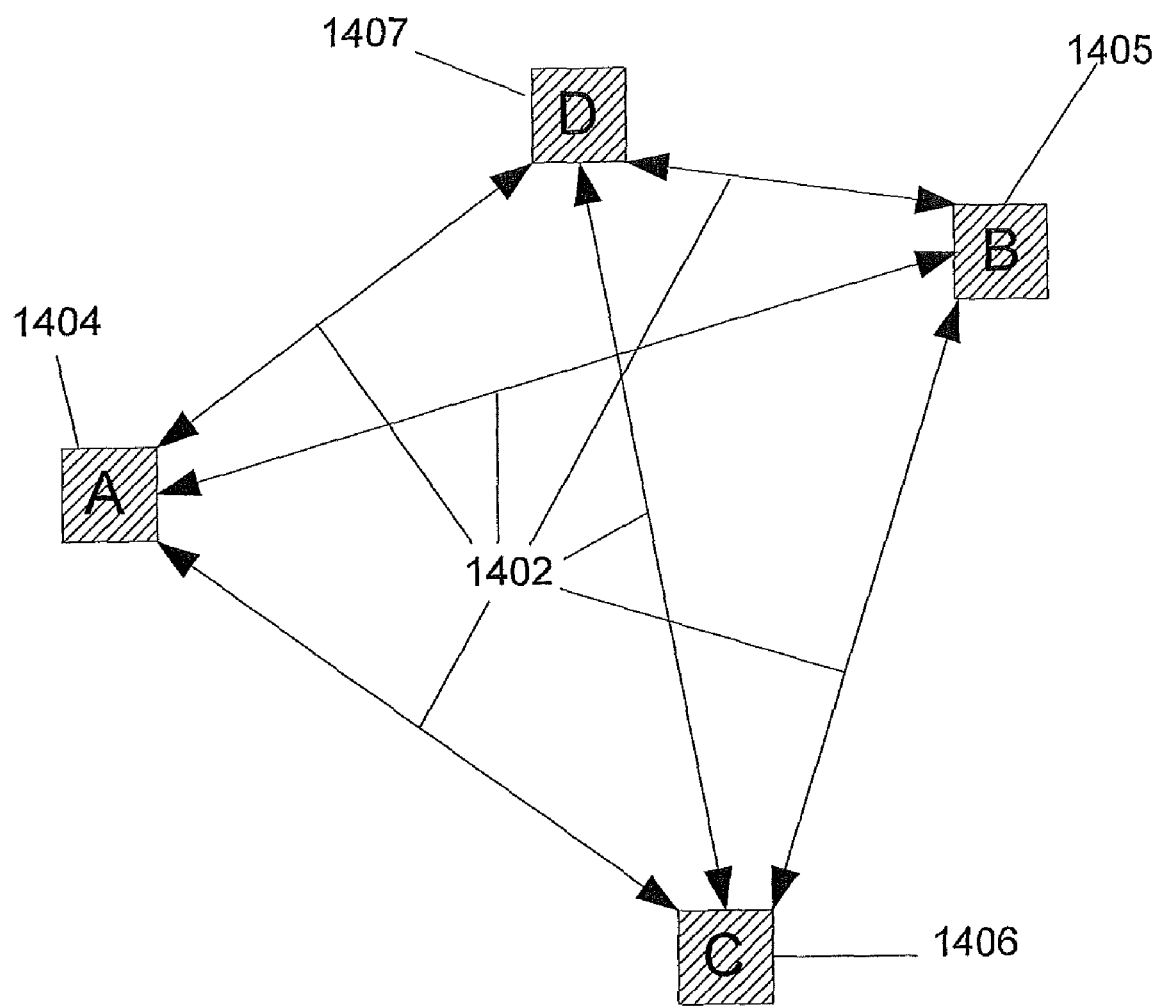
FIG. 14 shows a set of four fully interconnected devices arranged in three dimensions to illustrate the 3D position and velocity capability.

The problem is easily extended to three dimensions in which the fundamental building block is four devices arranged on the corners of a tetrahedron in 3D space. This is illustrated in FIG. 14 in which four devices arranged in 3D space, A 1404, B 1405, C 1406 and D 1407 sends signals and measurement data to one another 1402. Once again it is assumed that the "in band" approach is used to send measurements to other devices at the same time as sending the signal used for range and time measurement. However, any of the other "out-of-band" approaches could equally be used, including sending the measurements to a completely separate Position Processing device.

When operating in 3D space the range, velocity, phase and frequency offset measurements remain the same as previously described, but they are now mapped into a three dimensional Cartesian coordinate space:

$$d_{ij} = \sqrt{(x_j - x_i)^2 + (y_j - y_i)^2 + (z_j - z_i)^2}$$

and similarly for the velocity.

Since the devices are being positioned relative to one another the choice of Cartesian reference frame to use is arbitrary, and it is helpful in understanding the problem solution to define it as follows with reference to FIG. 14:

Let the position of device A 1404 be at the origin $x_a = 0$, $y_a = 0$, $z_a = 0$ Let device B 1405 lie on the x axis at $x_b = d_{ab}$, $y_b = 0$, $z_b = 0$ Let device C 1406 lie on the plane formed by the x and y axes such that $z_c = 0$ Therefore the following positions are unknown: $x_b$, $x_c$, $y_c$, $x_d$, $y_d$, $z_d$. The same applies to the velocities, and therefore we have 6 unknown positions, 6 unknown velocities, 3 unknown phase offsets and 3 unknown frequency offsets giving 18 unknowns, but there are 24 measurements—6 links in both directions and two measurements for each link direction.

The equations and method for solving them are the same as those described above, culminating in the cost function equations 29, 30 and 31 which have all been expressed in terms of ranges and range velocities linking devices.

In practice the solution is likely to be constructed as a general 3-dimensional problem which is constrained to two-dimensions for those applications operating on a plane surface. The constraint would typically be implemented by fixing the Z coordinate rather than leaving it free.

However, most 2-dimensional applications operate on a constrained surface that is not necessarily a plane. In this case the solution is constrained using a Z coordinate that lies on the application plane. The numerical methods and techniques that may be used to constrain variables within the cost function have been widely studied and many algorithms are documented in the literature. These methods are familiar to those trained in the art and so will not be described any further.

Scaling to Large Clusters of Devices

The complexity of solving the equation set rises exponentially for large clusters as the number of measurements increases and the number of unknowns being solved for increases. Therefore it is highly desirable to manage the equation set around an optimum size. Furthermore the position of any one device is affected mostly by measurements of its neighbours and less so by neighbours' neighbours that it cannot "see", and even less by devices more than two signal hops distant. Thus it may be unnecessary for every device to solve all the equations including the positions of the other devices in the cluster, so there are a number of different strategies that can be used to split the "whole cluster" problem amongst the devices in the cluster so that they work collectively to solve the whole problem.

The optimum problem size depends on many device parameters such as available memory and processing as well as system parameters like the required location update interval—larger sets of equations generally lead to better performance, but resource requirements in the device rise exponentially so this leads to the need for a strategy to dynamically adjust the problem size.

Figure 15:
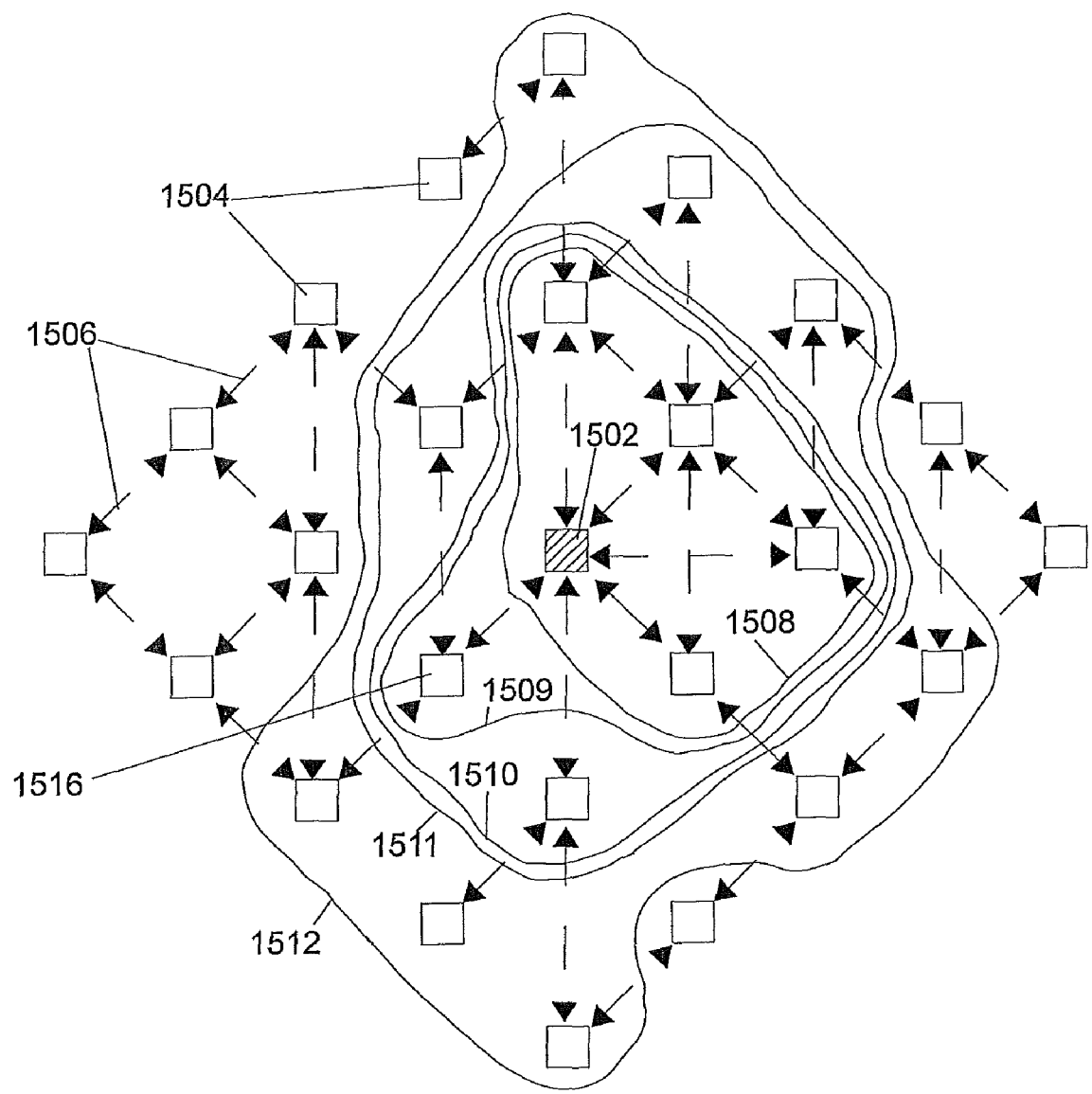
FIG. 15 shows a larger network of devices in 2 dimensions to illustrate how the network can be divided into different sub-clusters having different characteristics for the purpose of scaling the solution across large networks.

FIG. 15 illustrates a network of interconnected devices for the purpose of showing how a cluster problem for a particular device might be formulated and adjusted in size according to the needs of the device and the system at the time. A number of devices 1504 (intended to designate all devices marked as squares in the drawing) signal 1506 to one another (intended to indicate all signals in the drawing), the interconnecting arrowed lines indicating which devices can communicate with which others—the figure intentionally showing some devices interconnected and others not. The figure illustrates how a specific device 1502 uses the interconnections with it neighbours in order to construct a cluster around it that may be used to solve for its own position and speed.

A typical problem will start by constructing a set of equations that uses measurements for all the neighbouring devices over a short period of history comprising, say, the last 5 measurement sets. The devices used fall within enclosure 1510; it is easy to see that device 1502 is connected to six neighbours.

If it is necessary to reduce the problem size the following strategies could be used:
 1. Reduce the equation set to include only those neighbours that either share a common sibling or are mutually connected—indicated by enclosure 1509 and including five neighbours;
 2. Reduce the equation set further to include only those neighbours that are mutually connected—indicated by enclosure 1508 and including 4 neighbours;
 3. Reduce the number of history points used.

If it is necessary to increase the problem size (improved performance) the following strategies could be used:
 1. Include all shared sibling devices of the neighbours—indicated by enclosure 1511 and including nine other devices;
 2. Include all siblings of neighbours (all devices within 2 hops)—indicated by enclosure 1512 and including 15 other devices;
 3. Increase the number of history points used.

Increasing the size of the problem to include devices more than two hops distant yields diminishing benefit because such remotely connected devices have less influence on the position of the central device.

Adjusting the problem size according to these rules need not be strictly procedural and is likely to depend on the nature and requirements of the application as well as the capabilities of the devices and also the quality of the measurements being made. For example received signal quality and cluster geometry (DOP—dilution of precision) measures may be used as additional qualifiers for the inclusion or exclusion of other devices in the cluster. For example in choosing between two otherwise equally good neighbours the one with the better signal quality could be used, or the one which leads to a better solution geometry (DOP).

As a general rule a realistic implementation might aim for an equation set involving 9 neighbour devices and using 7 historical measurement sets. The normal operating range might be expected to be 5 to 15 neighbours and 3 to 13 historical measurement sets. However, the system will continue operating even with the minimum number of neighbours.

The above strategy leads to a situation where, in large clusters, each device only computes its position with respect to its neighbours. Based on the equations described it is trying to compute the positions and speeds of the neighbours used in its calculations. In all but the minimum equation set described above in which only interconnected neighbours are used, this leads to situations around the edge of the cluster in which some of the devices have insufficient link connections in order to compute their positions.

For example even enclosure 1509 above includes one device, labelled 1516, that would have only one connection—to 1502—and therefore only a range could be obtained and not a position for it.

Therefore to operate a large cluster of devices it is necessary to use a strategy in which the "whole cluster" problem is effectively partitioned amongst all the devices in the cluster in such a way that each sub-cluster is self supporting, and preferably sharing the problem solution amongst all devices.

Figure 19:
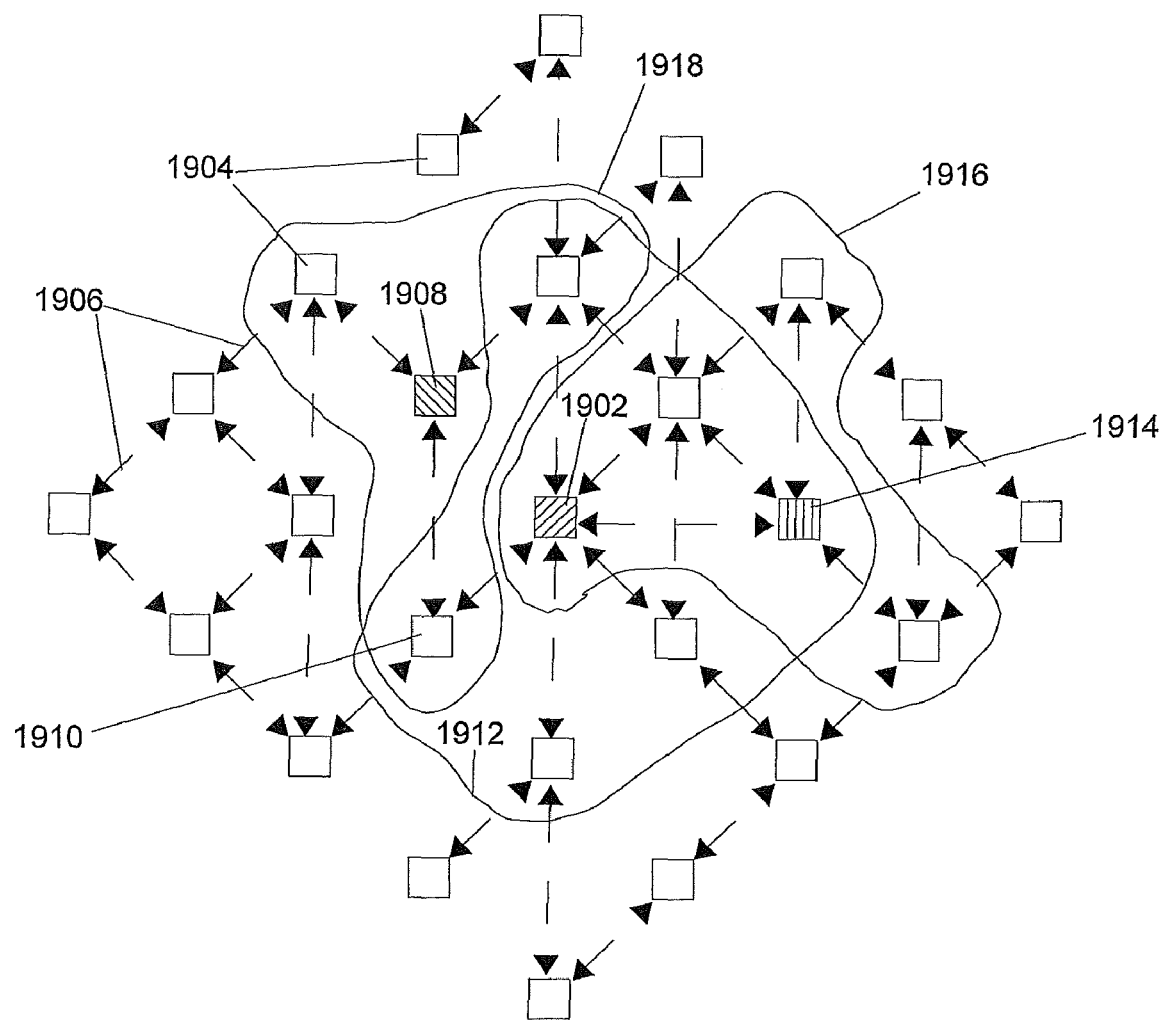
FIG. 19 shows the network devices of FIG. 15 showing how three different devices each have their own unique sub-cluster formed around themselves.

FIG. 19 shows the same network as in FIG. 15 but illustrates how different sub-clusters are formed around different devices. Device 1902 has cluster 1912 formed from immediate neighbours and corresponding to the same cluster in FIG. 15. Device 1914 has cluster 1916 formed, and in this case the cluster includes the device 1902 and the clusters overlap. Cluster 1918 is formed in a similar way around device 1910 but this cluster does not include device 1902, although it overlaps cluster 1912, but it does not overlap cluster 1916.

In order to support partitioning of the problem amongst the nodes we might arrange for each node to compute only its own position. One reason for doing so is that each device is best placed to compute its own position because it can construct the best possible sub-cluster with itself at the centre. In order to do this it would be helpful for it to know the positions of the other nodes used in the set of equations, and these variables would then be constrained in the minimiser. By incorporating information about the certainty or quality of the position of other devices the minimiser problem can be weighted appropriately. For example a device who's position is certain by virtue of being installed at a known location would have its position in the equation set fixed and unambiguous. Mobile devices may initially have highly uncertain positions, especially when the cluster is started or a new device joins, but when mutual connectivity is good there may be high confidence in the calculated position.

Devices need not compute only their own position, they could compute as few or as many of the positions of devices within the sub-cluster they have constructed, subject only to sufficiency of the problem and computation and memory capacity.

In the event that one or more devices are installed at fixed locations, for example to link the cluster to a specific geographic location, it is logical and sensible that the positions and velocities of these devices would be fixed within the minimiser equations.

General Operation of a Device within the Cluster

Figure 16:
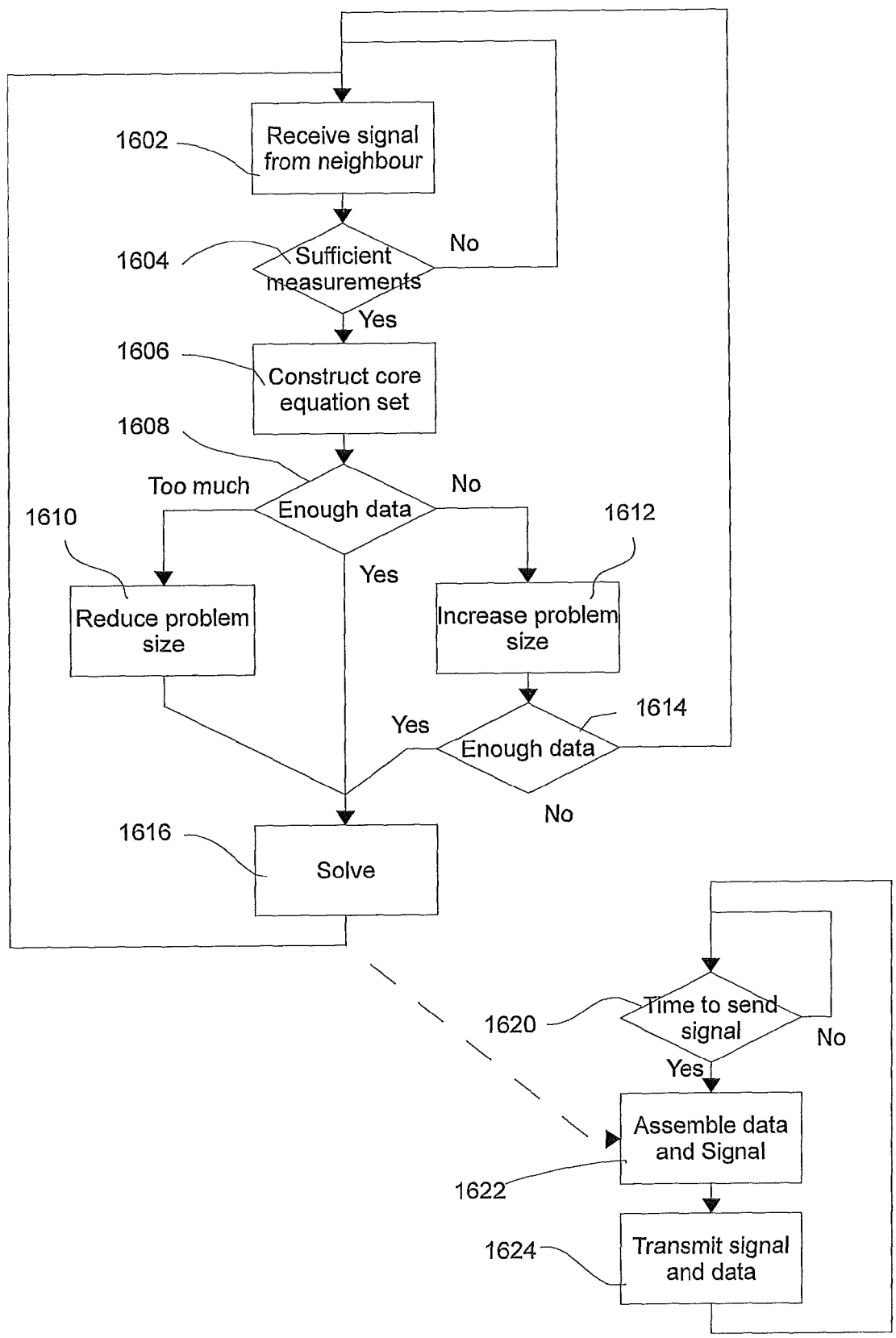
FIG. 16 is a general processing flow chart, showing the major steps for receiving and sending signals and data for the broadcast mode of operation.

Generally devices would operate as described above computing their own, and optionally, some of their neighbour device positions and speeds and the phase and frequency offsets. To do so they would normally construct a problem set as close to the optimal size as possible, utilising close neighbours in preference to those further away. Assuming that the network architecture in which each device sends both signal and data to its neighbours and that each is responsible for its own computations, the flow chart of FIG. 16 illustrated the general operation of each device.

There are independent receive and transmit functions which share data.

The receive function normally waits to receive a signal 1602 from a neighbour. If sufficient 1604 measurements have been received it continues with the processing the data 1606, otherwise it returns to wait for further received signals 1602.

The first step in processing received measurements is to construct the problem equation set 1606. This function may select data based on measurement quality and signal strength, but would in general use a process similar to that described earlier. If this results in a problem set of the right size 1608 it would then go directly to solve the problem 1616, otherwise if there is too much data the problem would be reduced 1610 using the strategies described earlier before going on to solve it 1616. If the problem set is too small to be useful, the device may wish to expand its size 1612 using the strategies described earlier. If the final problem is still too small it goes back to receive mode waiting for further neighbour signals 1602, otherwise the expanded problem is taken forward to the solver 1616.

The solver 1616 uses a numerical minimisation technique in which a cost function for the equation set is constructed and a best fit solution is found. The solver finds the position and speed of the device, and optionally of neighbours that have not been constrained, and the phase and frequency offsets of the clocks of neighbours.

The transmit function runs in parallel to the receive function, mostly waiting 1620 for the next scheduled transmission time. This may be against a regular schedule of signal transmissions, or it could be a specific scheduled time, or it could be on a random access contention (aloha type) algorithm. The choice of when to transmit and how often is generally dictated by the requirements of the specific application for which the device is being used.

At the allotted transmission time, the device constructs 1622 a measurement signal and a data payload using data from the solver 1616 if required. It then transmits the signal and data 1624 using a broadcast mode to all neighbouring devices, and returns to the wait loop 1620.

Description of Data Exchanged Between Devices in the Cluster

Figure 3:
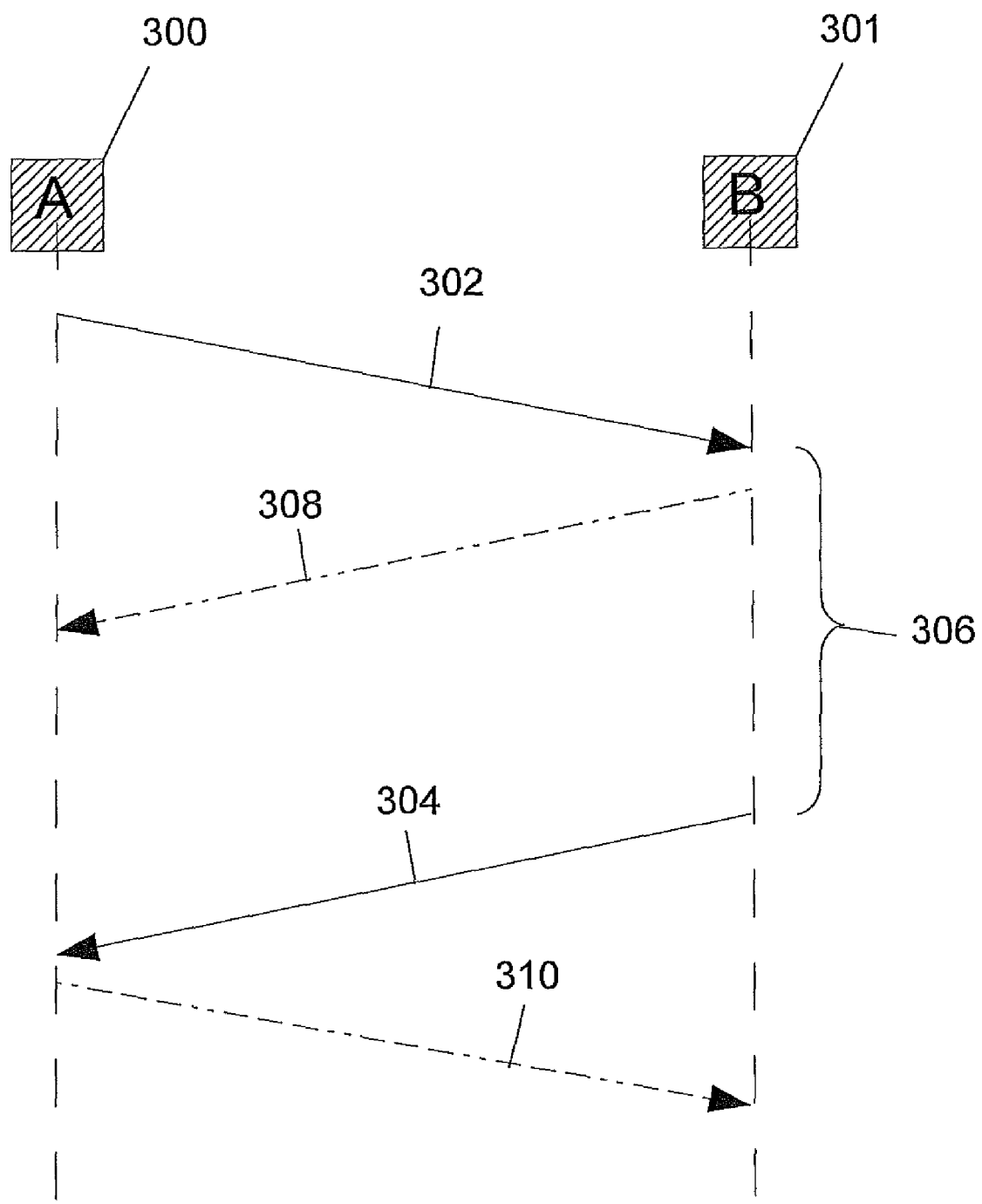
FIG. 3 shows the exchange of signals for measuring range and data messages containing measurements to allow either to compute the range and time offset.

When a device measures the signal received from another node it measures at least one phase and one frequency, and these need to be transmitted back to the sending node. Therefore there exist four logical simplex paths as illustrated in FIG. 3 between each pair of devices, in this case A 300 and B 301:
1. Signal transmission from A to B 302
2. Transmission of measurement data for A's signal from B to A 308
3. Signal transmission from B to A 304
4. Transmission of measurement data for B's signal from A to B 310

The signal transmission and measurement data transmission may be done using completely separate communications channels or using the same channel on a shared basis.

Figure 17:
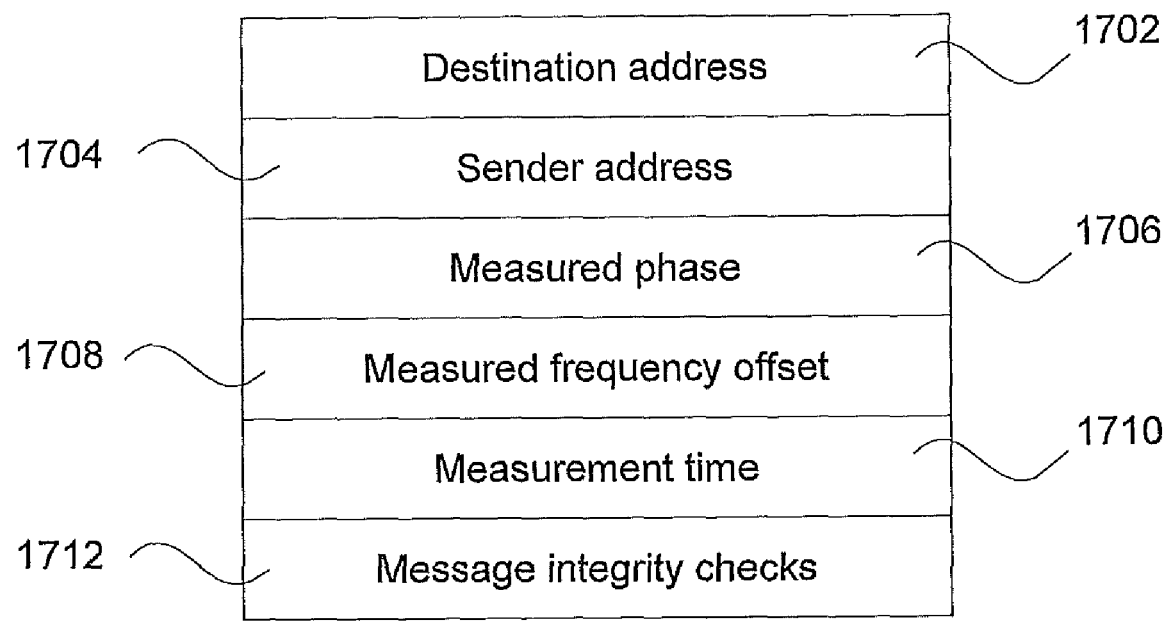
FIG. 17 shows a minimal set of data needed from devices in order to solve for position, speed and clock offsets.

Signal transmission operates on a broadcast basis, so that when device A sends its signal, this is to as many devices as can receive it as possible. Transmission of measurement data operates on a point-to-point basis which each measurement being transmitted from the receiving device to the sending device. This mode of operation is further illustrated in FIG. 9 in which the devices send their measurements to a separate device for position computation and in FIG. 10 in which the devices send their measurements back to the device that sent the signal. Data transmitted as illustrated in FIG. 17 comprises at least:
destination device address 1702
sending device address 1704
measured phase 1706
measured frequency 1708
measurement time 1710
Optional message integrity check 1712

This basic method is, however, not very efficient in the way it uses radio spectrum because it results in a large number of very short data transmissions, but it has the advantage that the measurements are received by the sending device very soon after it has sent its signal.

Figure 18:
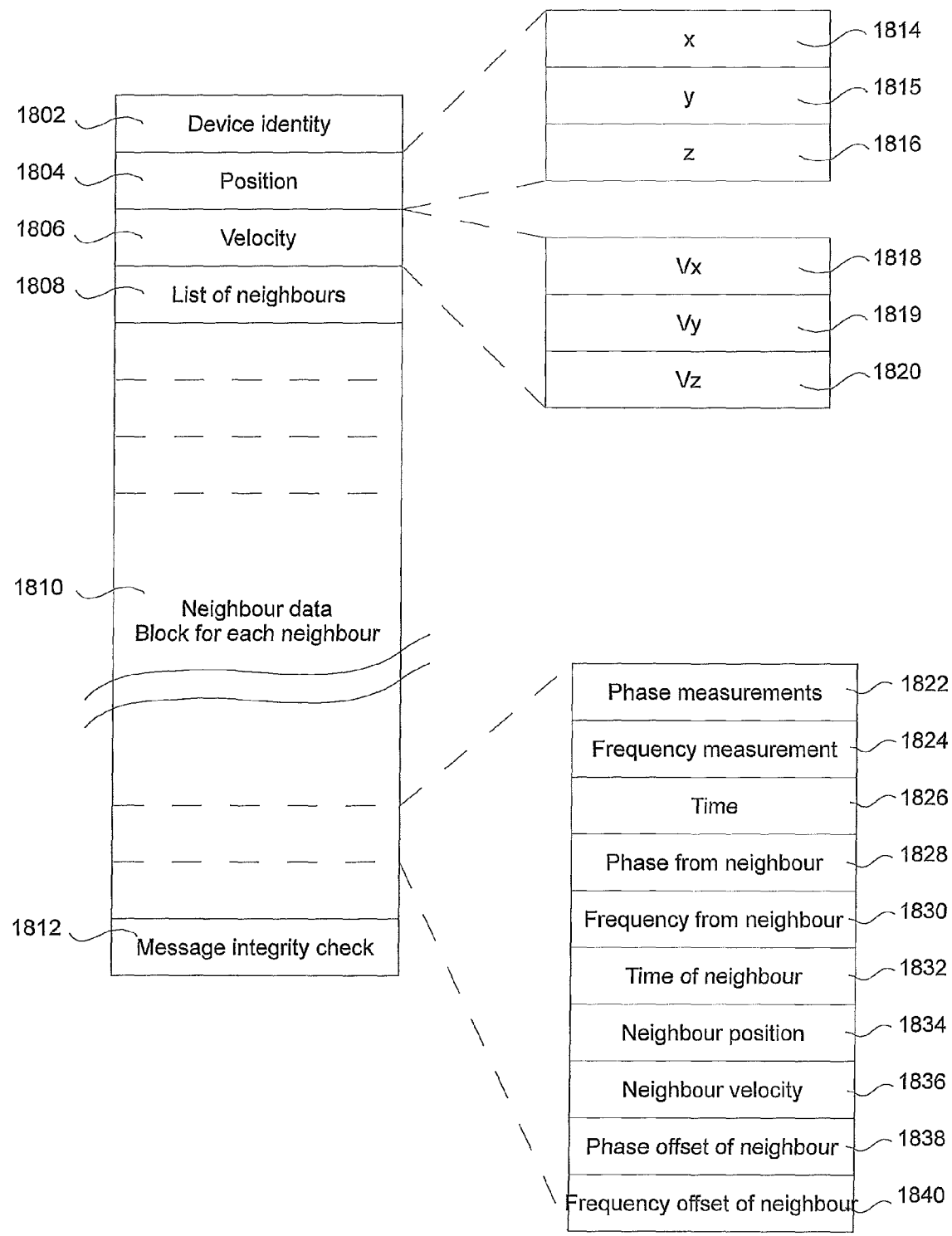
FIG. 18 shows a comprehensive set of data that allows enough flexibility to allow the whole-cluster problem to be partitioned dynamically amongst devices in the network.

An alternative option is to use a broadcast model as illustrated in FIG. 11, in which each device periodically transmits a block of measurement data for all the signals it has received since it last transmitted a set of measurements. As a minimum this block of measurement data comprises:
sending device identity
list of device identities from which measurements have been received
one or more phase measurements for each; in general the number of phase measurements reported would be one less than the number of tones making up the signal.
measured frequency for each
measurement time for each In order to complete the integrity of the cluster it is helpful to include measurements received from neighbours too. Therefore the following items are often added to the data block:
one or more phase measurements of the sending device made by neighbours for each
frequency measurement of the sending device made by neighbours for each
time of neighbour measurement for each In order to reduce the size of the problem computation required, and also to increase the integrity of the calculations it is useful for the sending device to include its own position as well as the positions, phase and frequency offsets for all the neighbours on the reporting list. FIG. 18 illustrates a complete data block incorporating the various essential, optional and useful data fields as follows:
sending device identity 1802
its position 1804: x 1814, y 1815, z 1816
its velocity 1806: vx 1818, vy 1819, vz 1820
list of neighbour identities 1808
for each neighbour the following:
one or more phase measurements of the neighbour signal 1822
frequency measurement of the neighbour 1824
time of measurement 1826
one or more phase measurements of its signal reported by the neighbour 1828
frequency measurement of its signal reported by the neighbour 1830
time of measurement reported by the neighbour 1832
neighbour position x, y, z—1834
neighbour velocity vx, vy, vz—1836
locally calculated phase offset of the neighbour 1838
locally calculated frequency offset of the neighbour 1840
message integrity check 1812

Most of this information can be transmitted in a compact integer format: assuming 16-bit resolution for each item, four phases and 9 neighbours this leads to: 7+9*21=196 measurements which, once communications overheads (errors checks etc) are added indicates a message of at least 400 bytes in size, potentially up to 1 kB. However, there are many well known techniques that can be used to reduce the quantity of data.

Instead of using a separate communications channel for the measurement data, it could be combined with the signal transmission so that every time the measurement signal is transmitted a block of accompanying data is sent along with it.

Other Variations

In the description of the basic range measurement between two devices it was described how the range could also be determined by combining at least three measurements of signals transmitted in only one direction. This approach can also be used in the general positioning solution and therefore one could have a cluster in which some devices are transmit only while others may be receive only or both receive and transmit. Such an approach could allow for a mixed cluster in which some devices, the transmit only ones, are very low cost basic devices thereby opening up opportunities for extremely low cost solutions for some applications.

Whereas the general assumption has been that the system operates using radio signals, the core approach used is independent of frequency and is equally applicable to acoustic, ultrasonic or sonar systems. In these cases the range equations are adjusted to take into account the wavelength and speed of propagation of the signal in these media.

Broadly, we have described a device that is able to compute its range and time offset relative to another similar device, and thereby also a three-dimensional position, speed and time relative to other similar devices provided that at least four are present and within range. It does so by transmitting at least two signals at different frequencies and by receiving similar signals transmitted by the other devices. The signals are normally radio transmissions but they are constructed so that they are independent of the radio band used and so that they lead to cancellation of common-mode effects in the transmitter and receiver circuits. Being agnostic of the particular band being used means that the system is also applicable to optical, acoustic, sonar or other technologies. No fixed infrastructure of transmitters, receivers or local measurement units are required in order to determine the relative positions, velocities and time, and the devices do not need to be synchronised. If there are only three devices in a cluster then their relative positions and velocities in two-dimensions may be determined. If there are only two devices, the system allows the range, range velocity and time offset between them to be determined. The ranging technique may be used in wired systems in which it is desirable to obtain accurate time synchronisation between two devices that are cable connected and it also provides a measure of the cable length. The cluster of devices may comprise more than four, in which case the extra devices provide redundancy and allow the system to detect and correct for measurement errors caused by anomalous propagation of the signals in the environment. The system scales to very large networks of devices in which they work collectively each solving a part of the problem that describes the relative positions of all interconnected devices.

No doubt many other effective alternatives will occur to the skilled person. It will be understood that the invention is not limited to the described embodiments and encompasses modifications apparent to those skilled in the art lying within the spirit and scope of the claims appended hereto.

I claim:

1. A method of determining a relative range, relative velocity of motion, clock frequency offset, clock phase offset or time reference of a first device with respect to a second device, the method comprising:
   sending a first reference signal from said first device to said second device at a first time, wherein said first reference signal has a frequency and phase determined by a first reference clock of said first device;
   receiving at said first device a second reference signal sent from said second device at a second time, wherein said second reference signal has a frequency and phase determined by a second reference clock of said second device;
   determining a phase of said second reference signal with respect to said first reference clock and determining a frequency of said second reference signal;
   receiving from said second device measurement data, said measurement data comprising data from a determination of a phase of said first reference signal with respect to said second reference clock and from a determination of a frequency of said second reference signal at said second device;
   determining at least one of said relative range, relative velocity of motion, clock frequency offset, clock phase offset or time reference of said first device with respect to said second device by determining a substantially self-consistent solution to at least one equation of a set of equations of the form:

$$d(t_i) = f_d(\Phi_m(t_i), \theta(t_i))$$

$$v(t_i) = f_v(\Delta f_m(t_i), \zeta)$$

where
   $f_d$ and $f_v$ are respective range and velocity determining functions;
   $t_i$ labels said reference times;
   $d(t_i)$ labels said relative range at said reference times;
   $v(t_i)$ labels said relative velocity at said reference times;
   $\Phi_m(t_i)$ labels said determined phase at said reference times;
   $\theta(t_i)$ labels a phase offset between said first and second reference clocks at said reference times;
   $\Delta f_m(t_i)$ labels a frequency difference between a said determined frequency and a frequency of a said reference clock at the device at which said frequency is determined, at said reference times; and
   $\zeta$ labels a frequency offset between said first and second reference clocks at said reference times; and
wherein said first and second reference clocks are unsynchronised with one another, and wherein said determining of said substantially constant solution comprises compensating for a said phase and frequency offset between said first and second reference clocks such that a frequency offset and changing phase one of said unsynchronised reference clocks is characterised with respect to the other of said reference clocks by said parameters $\theta(t_i)$ and $\zeta$.

2. A method, using the method of claim 1, of determining a position of a device in two or three dimensions by determining one or both of relative range and relative velocity of two or more pairs of devices in an interconnected cluster of three or more devices, the method using the method of claim 1 and then using said determined information to calculate said position of said device.

3. A method, using the method of claim 2, of using one device to identify one or both of relative range and velocities of a plurality of devices in a cluster of devices, the method using the method of claim 2 then capturing corresponding range data from a plurality of other devices of said cluster.

4. A method, using the method of claim 1, of determining relative position of devices in cluster of devices, the method comprising:
   selecting a first reference said device to define a fiducial point of a co-ordinate system;
   identifying positions of a plurality of second devices with reference to said first device using the method of claim 1;

sharing data for said positions with said second devices; and using one or more of said second devices to identify positions of a plurality of third devices in said coordinate system each with reference to one of said one or more second devices using the method of claim 1.

5. A method as claimed in claim 4 wherein said sharing comprises sharing a reference time or time offset data with said second devices to effectively determine a time standard within said cluster of devices.

6. A method as claimed in claim 4 wherein determining of a said position using the method of claim 1 comprises representing a position of said device in said co-ordinate system in said equations for which said substantially self-consistent solution is determined.

7. A method as claimed in claim 1 comprising determining both a relative range and a relative velocity of said devices and using one of said relative range and relative velocity, in combination with the other of said relative range and relative velocity and a time interval between two or more of said times, to constrain one of said relative range and relative velocity.

8. A method of determining a relative range, relative velocity of motion, clock frequency offset, clock phase offset or time reference of a first device with respect to a second device, the method comprising:
   receiving a first reference signal at said first device, from said second device, at a first time, wherein said first reference signal has a frequency and phase defined by a second reference clock of said second device;
   determining a phase of said first reference signal with respect to a first reference clock of said first device, and determining a frequency of said first reference signal;
   repeating said receiving and determining for second and third said reference signals received at second and third respective times;
   determining at least one of said relative range, relative velocity of motion, clock frequency offset, clock phase offset or time reference of said first device with respect to said second device by determining a substantially self-consistent solution to a set of equations of the form:

$$d(t_i)=f_d(\Phi_m(t_i),\theta(t_i))$$

$$v(t_i)=f_v(\Delta f_m(t_i),\zeta)$$

where
   $f_d$ and $f_v$ are respective range and velocity determining functions;
   $t_i$ labels said reference times;
   $d(t_i)$ labels said relative range at said reference times;
   $v(t_i)$ labels said relative velocity at said reference times;
   $\Phi_m(t_i)$ labels said determined phase at said reference times;
   $\theta(t_i)$ labels a phase offset between said first and second reference clocks at said reference times;
   $\Delta f_m(t_i)$ labels a frequency difference between said determined frequency of said first reference signal and a frequency of said first reference clock at said reference times;
   $\zeta$ labels a frequency offset between said first and second reference clocks at said reference times; and
   wherein said first and second reference clocks are unsynchronised with one another, and wherein said determining of said substantially constant solution comprises compensating for a said phase and frequency offset between said first and second reference clocks such that a frequency offset and changing phase of one said unsynchronised reference clocks is characterised with respect to the other of said reference clocks by said parameters $\theta(t_i)$ and $\zeta$.

9. A method, using the method of claim 8, of sending a reference clock signal over a wired link, the method using the method of claim 8 to determine a relative distance or time offset between said first and second devices, said first and second devices being connected by said wired link.

10. A method as claimed in claim 1 wherein said functions $f_d$ and $f_v$ have the form:

$$d(t_i)=\alpha(\Phi_m(t_i)-\theta(t_i))$$

$$v(t_i)=\beta(\Delta f_m(t_i)-\zeta)$$

where $\alpha$ and $\beta$ are constants.

11. A method as claimed in claim 1 wherein said characterisation is at a reference point in time of one of said first and second times such that said determined substantially consistent solution is effectively at said reference point in time.

12. A method as claimed in claim 11 wherein said reference point in time is a most recent one of said respective times.

13. A method as claimed in claim 1 wherein a said reference signal comprises a pair of tones modulated onto a carrier.

14. A non-transitory carrier carrying processor control code to, when running, determine the substantially self-consistent solution of claim 1.

15. A device comprising a system for determining a relative range, relative velocity of motion, clock frequency offset, clock phase offset or time reference of a first device with respect to a second device, the system comprising:
   a transmitter to send a first reference signal from said first device to said second device at a first time, wherein said first reference signal has a frequency and phase determined by a first reference clock of said first device;
   a receiver to receive at said first device a second reference signal sent from said second device at a second time, wherein said second reference signal has a frequency and phase determined by a second reference clock of said second device;
   a system to determine a phase of said second reference signal with respect to said first reference clock and determining a frequency of said second reference signal;
   a receiver to receive from said second device measurement data, said measurement data comprising data from a determination of a phase of said first reference signal with respect to said second reference clock and from a determination of a frequency of said second reference signal at said second device; and
   a system to determine at least one of said relative range, relative velocity of motion, clock frequency offset, clock phase offset or time reference of said first device with respect to said second device by determining a substantially self-consistent solution to at least one equation of a set of equations of the form:

$$d(t_i)=f_d(\Phi_m(t_i),\theta(t_i))$$

$$v(t_i)=f_v(\Delta f_m(t_i),\zeta)$$

where
   $f_d$ and $f_v$ are respective range and velocity determining functions;
   $t_i$ labels said reference times,
   $d(t_i)$ labels said relative range at said reference times;
   $v(t_i)$ labels said relative velocity at said reference times;
   $\Phi_m(t_i)$ labels said determined phase at said reference times;

$\theta(t_i)$ labels a phase offset between said first and second reference clocks at said reference times;

$\Delta f_m(t_i)$ labels a frequency difference between a said determined frequency and a frequency of a said reference clock at the device at which said frequency is determined, at said reference times; and $\zeta$ labels a frequency offset between said first and second reference clocks at said reference times;

wherein said first and second reference clocks are unsynchronised with one another, and wherein said determining of said substantially constant solution comprises compensating for a said phase and frequency offset between said first and second reference clocks such that a frequency offset and changing phase one of said unsynchronised reference clocks is characterised with respect to the other of said reference clocks by said parameters $\theta(t_i)$ and $\zeta$.

* * * * *